Figure 1:
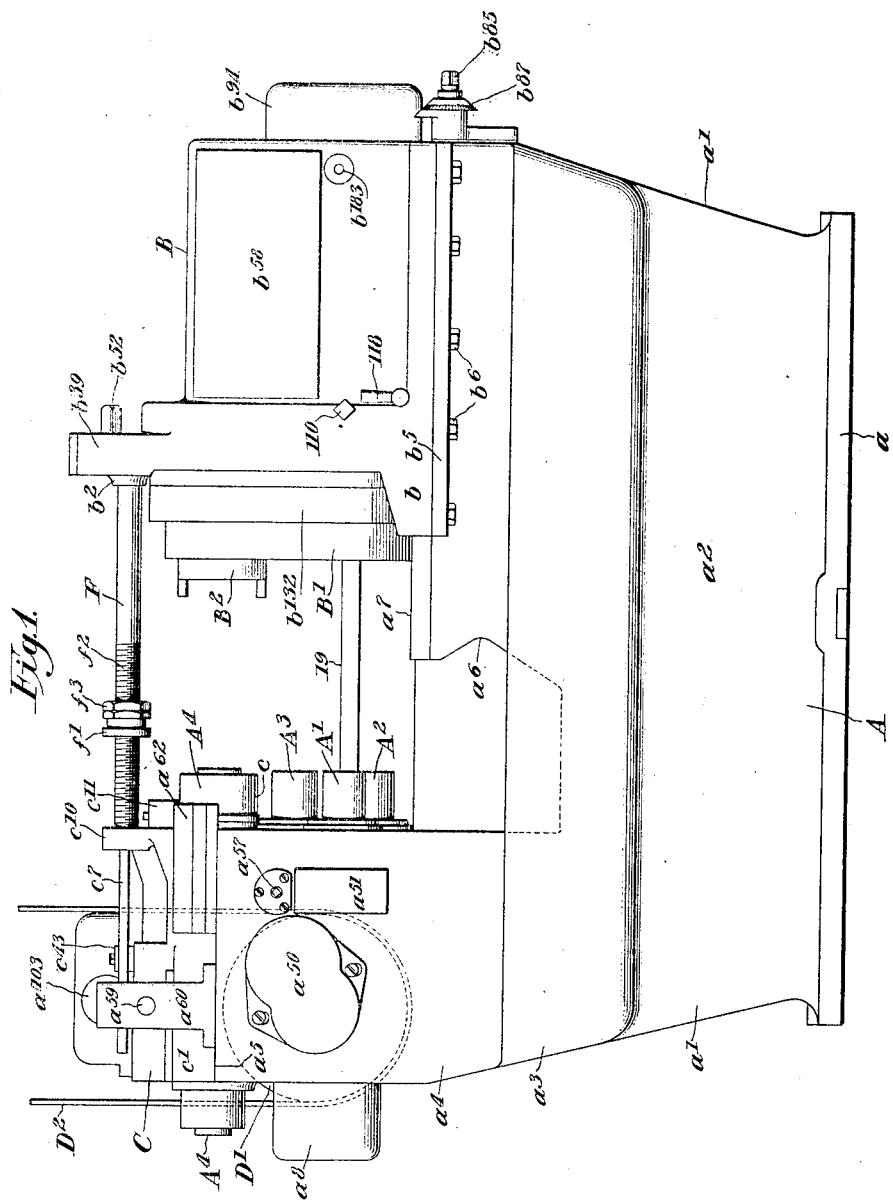

April 26, 1927.

A. L. DE LEEUW 1,626,187

THREADING MECHANISM

Original Filed Jan. 30, 1923    16 Sheets-Sheet 1

Inventor
Adolph L. De Leeuw
By    Attorney
Albert F. Nathan

April 26, 1927.

A. L. DE LEEUW 1,626,187

THREADING MECHANISM

Original Filed Jan. 30, 1923    16 Sheets-Sheet 2

April 26, 1927.

A. L. DE LEEUW 1,626,187

THREADING MECHANISM

Original Filed Jan. 30, 1923 16 Sheets-Sheet 6

Inventor
Adolph L. De Leeuw
By Attorney
Albert F. Nathan

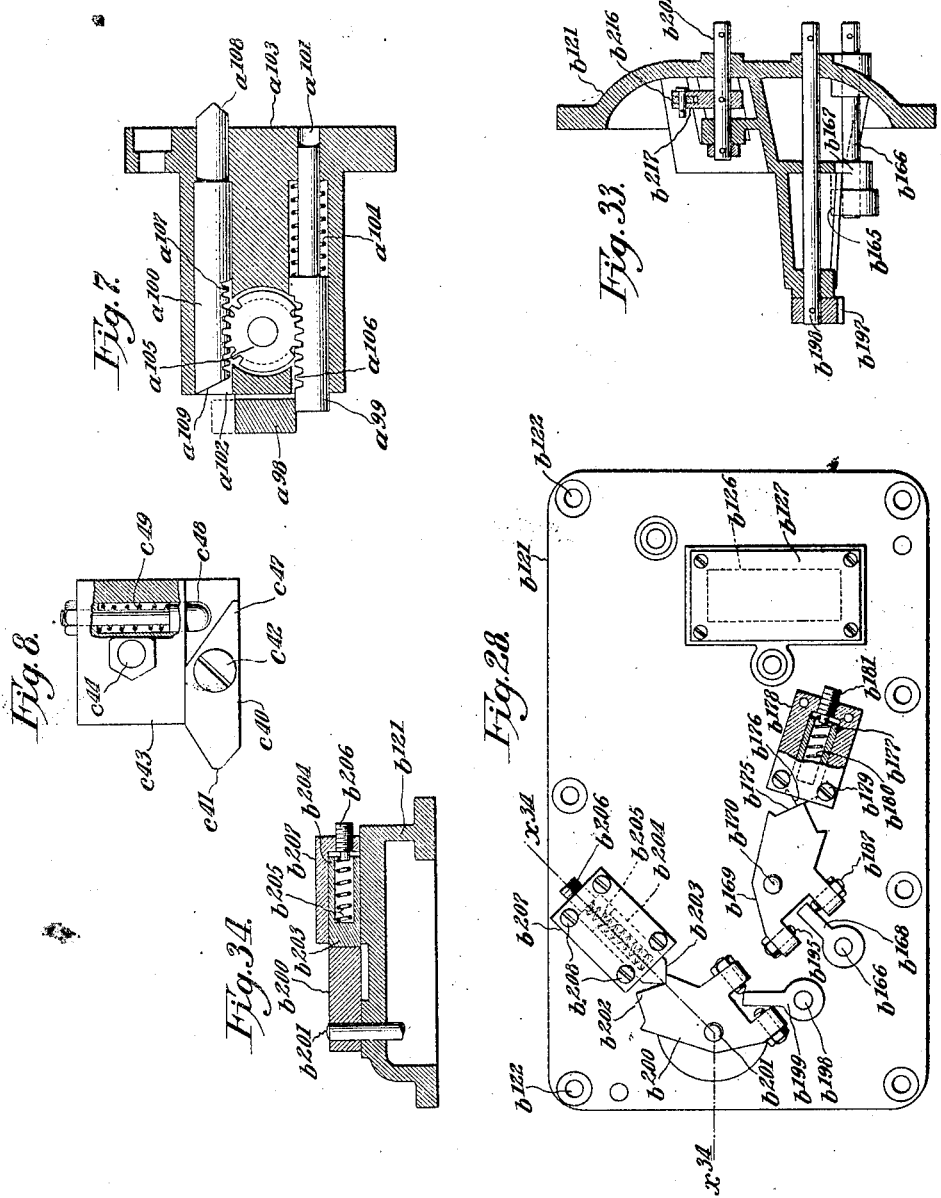

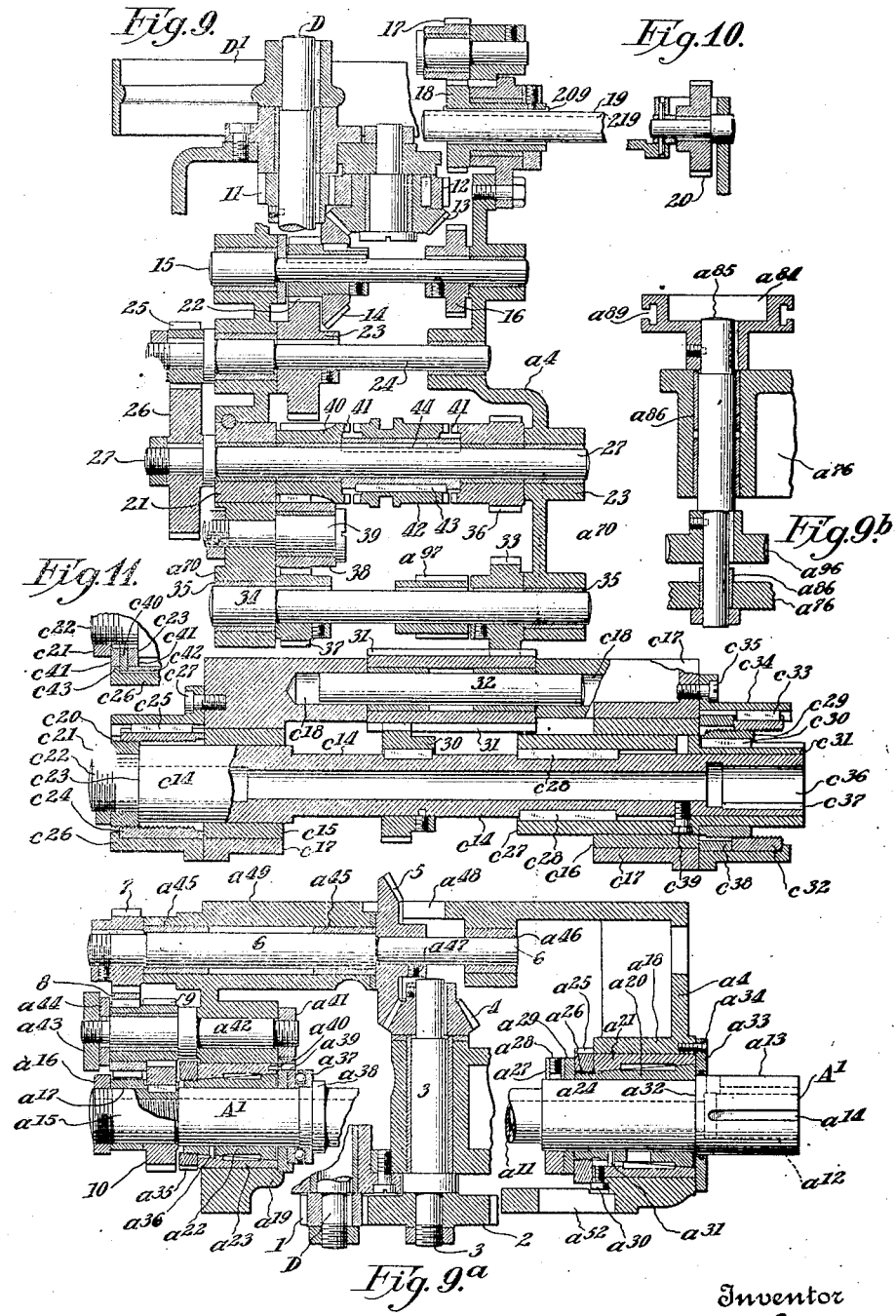

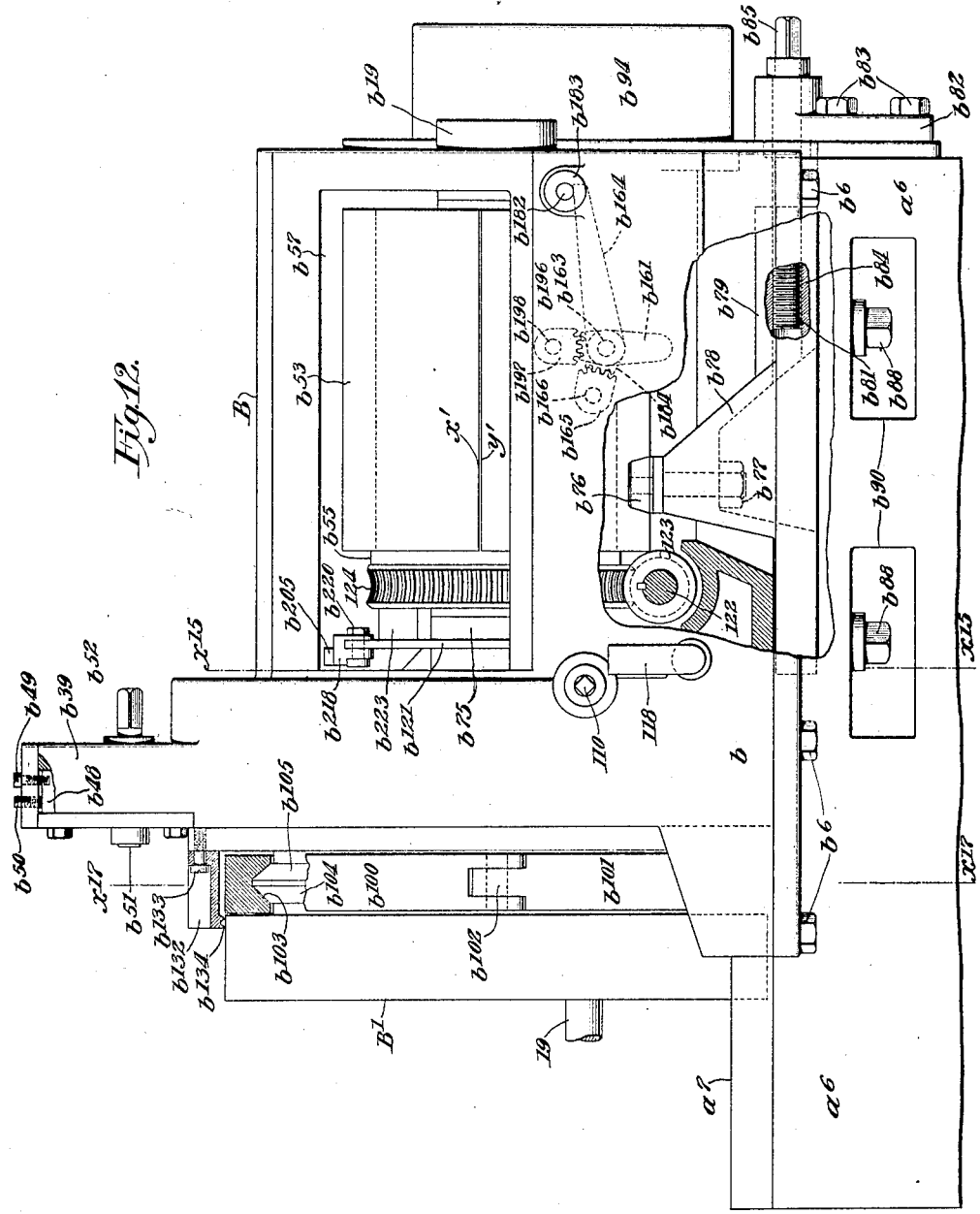

April 26, 1927.
A. L. DE LEEUW
1,626,187
THREADING MECHANISM
Original Filed Jan. 30, 1923    16 Sheets-Sheet 10
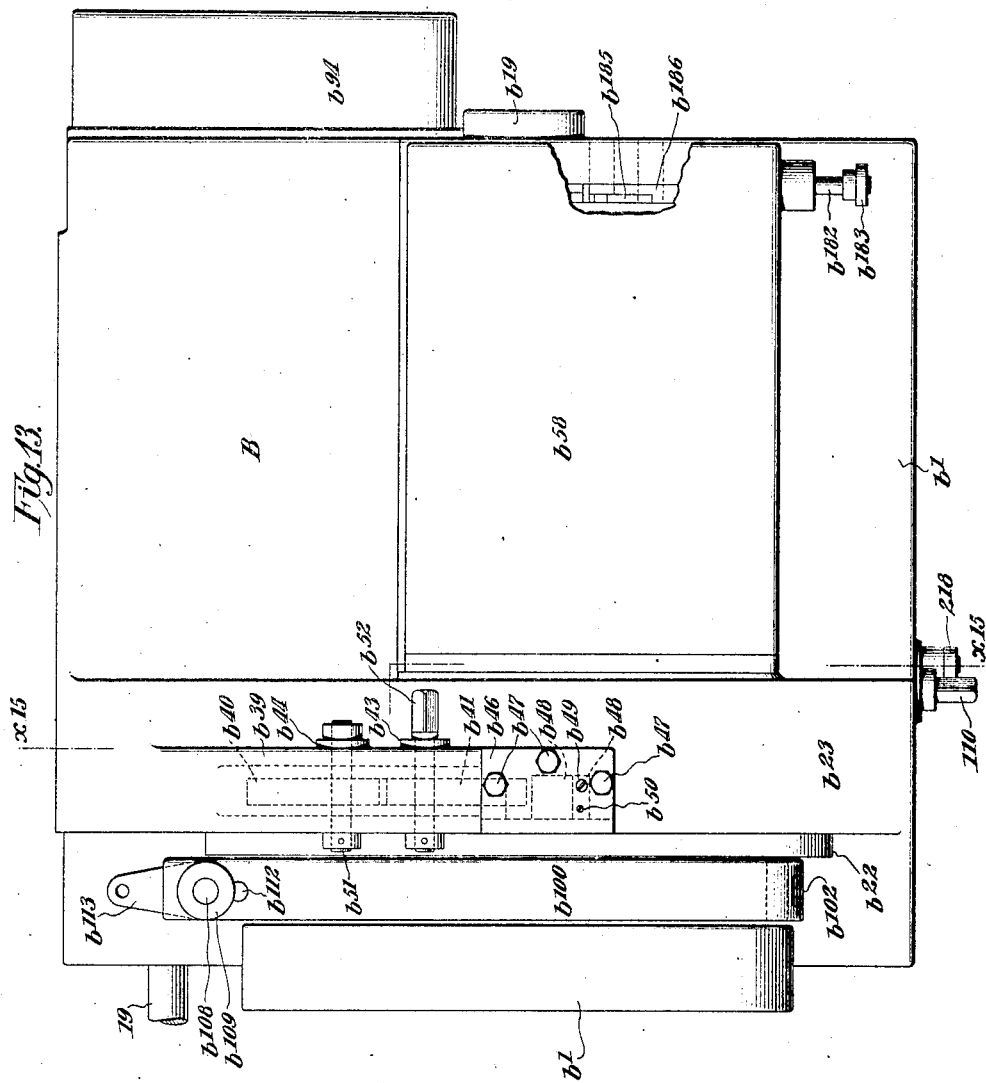
Inventor
Adolph L. De Leeuw
By  Attorney
Albert F. Nathan

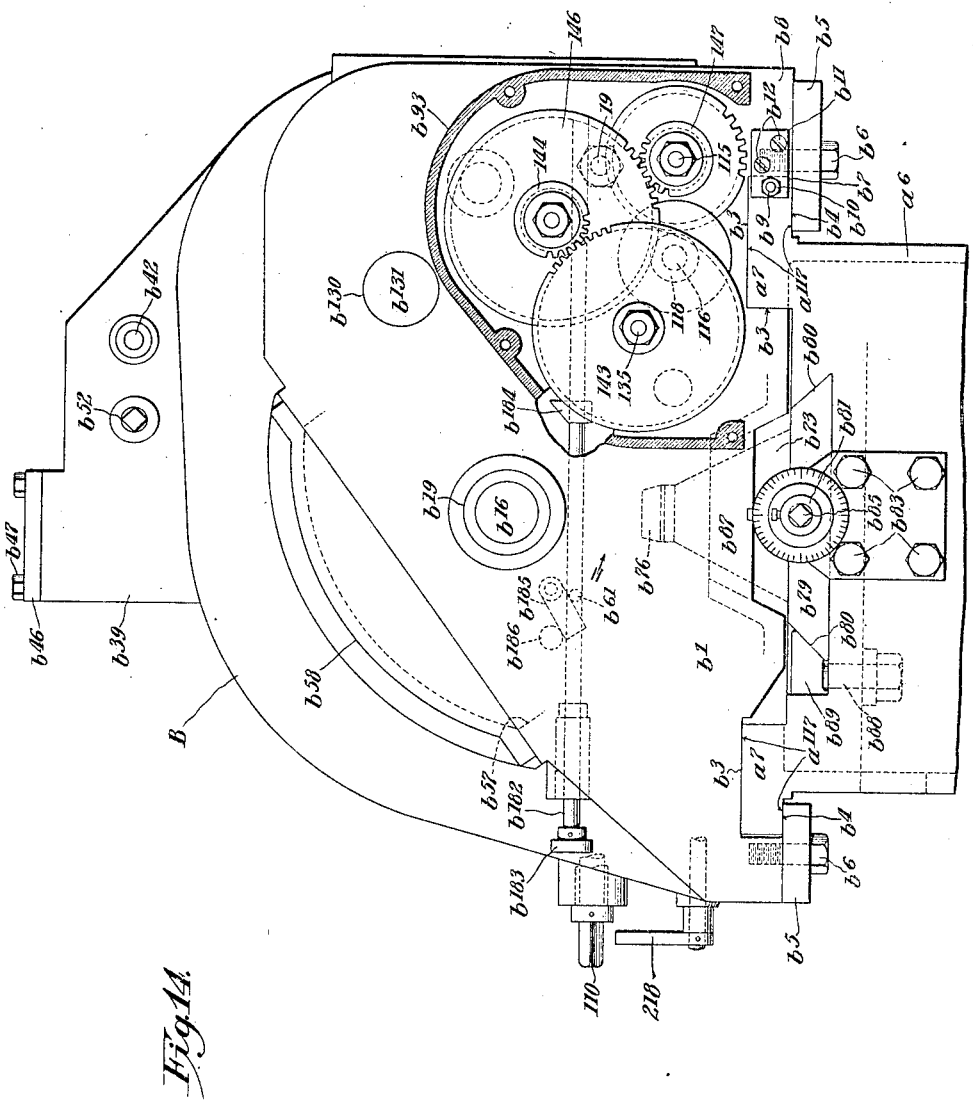

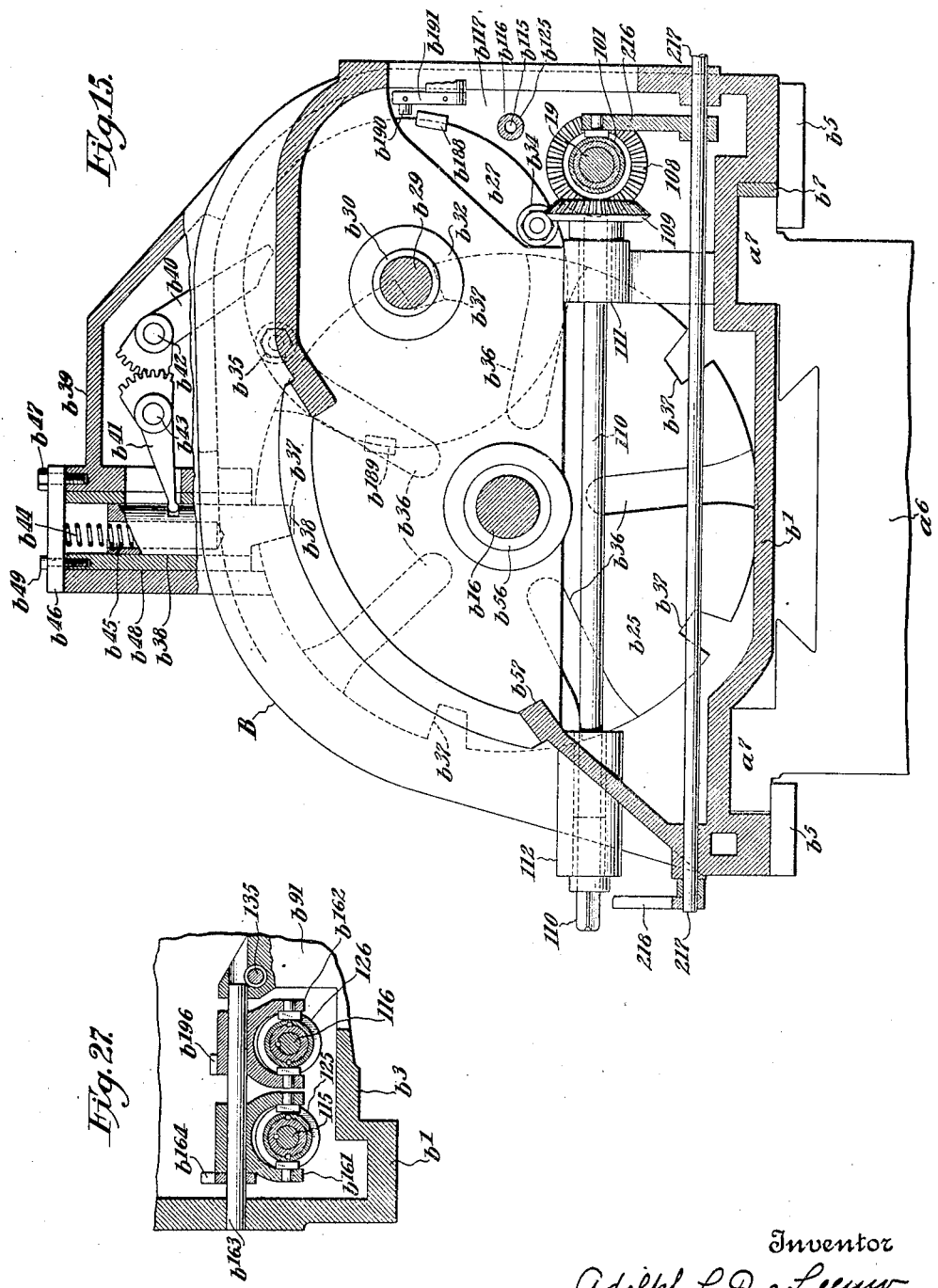

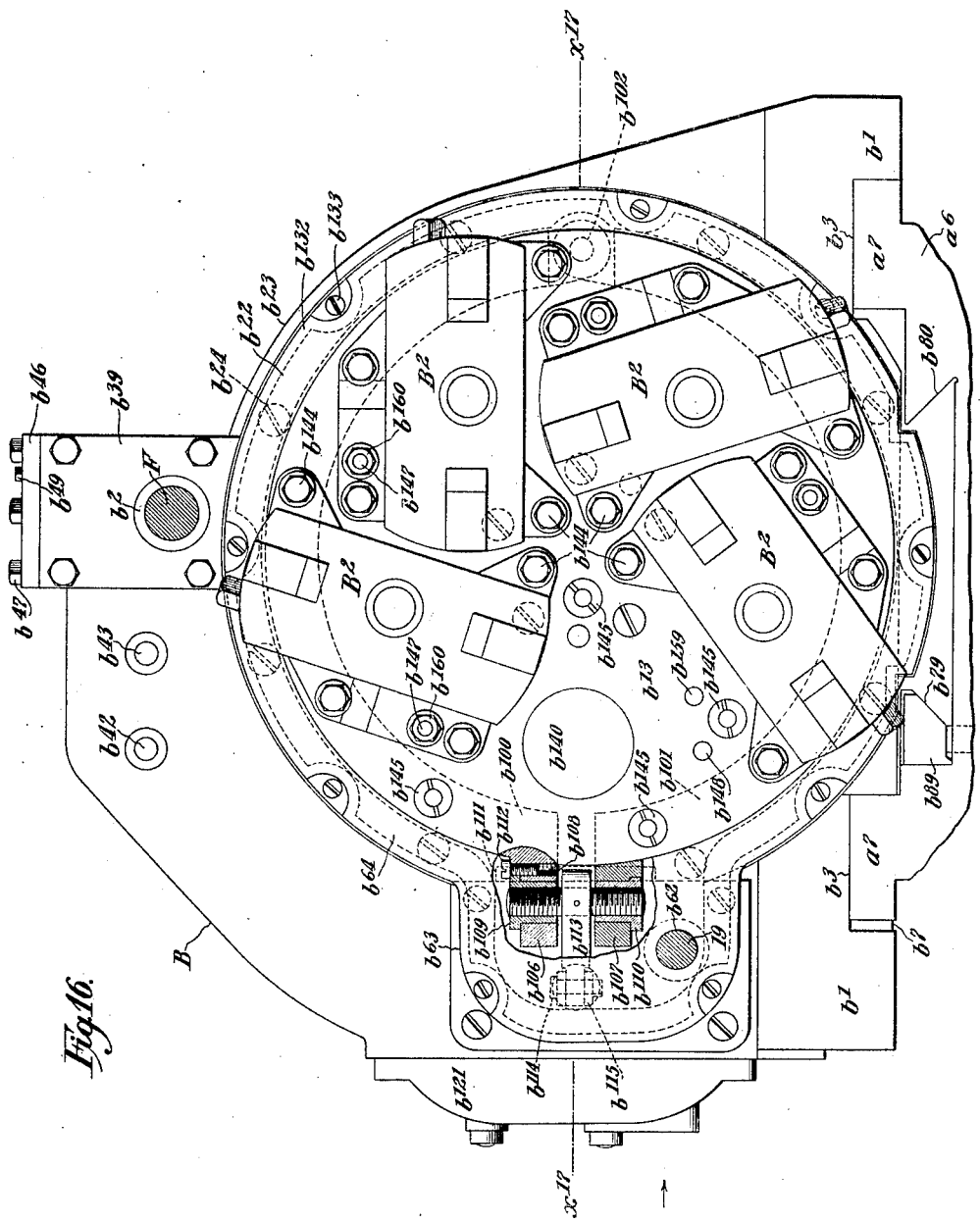

April 26, 1927.
A. L. DE LEEUW
1,626,187
THREADING MECHANISM
Original Filed Jan. 30, 1923   16 Sheets-Sheet 14
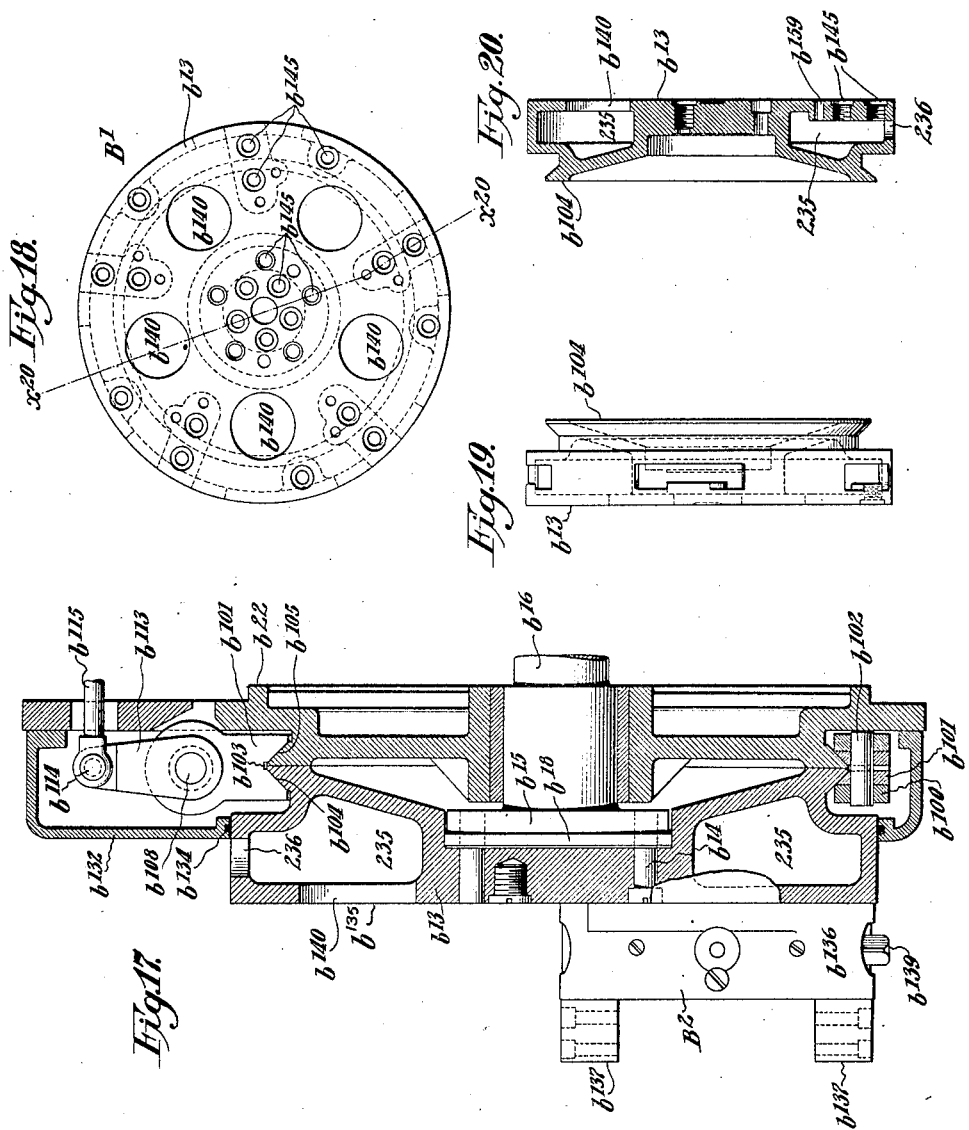
Inventor
Adolph L. De Leeuw
By  Attorney
Albert F. Nathan

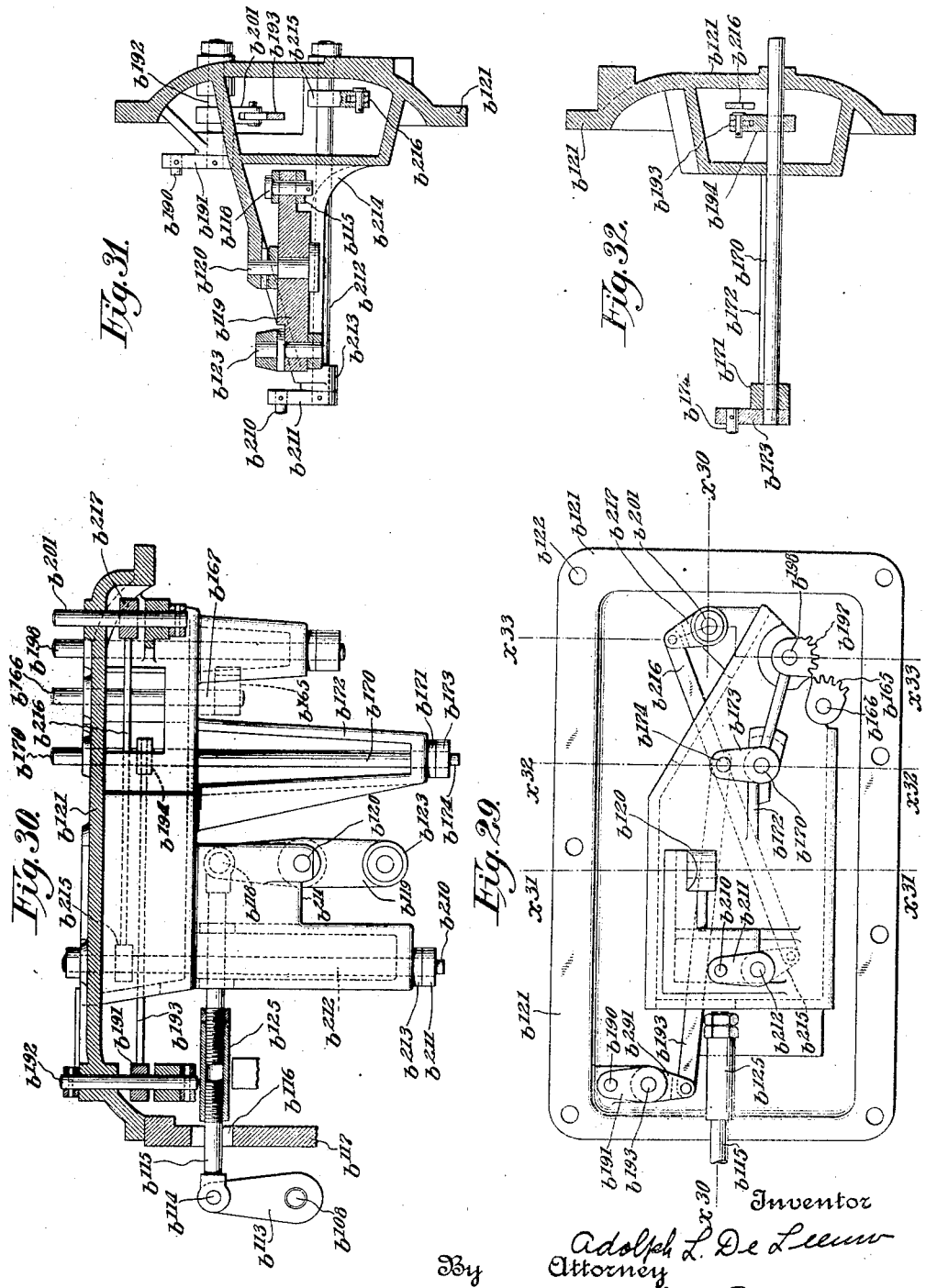

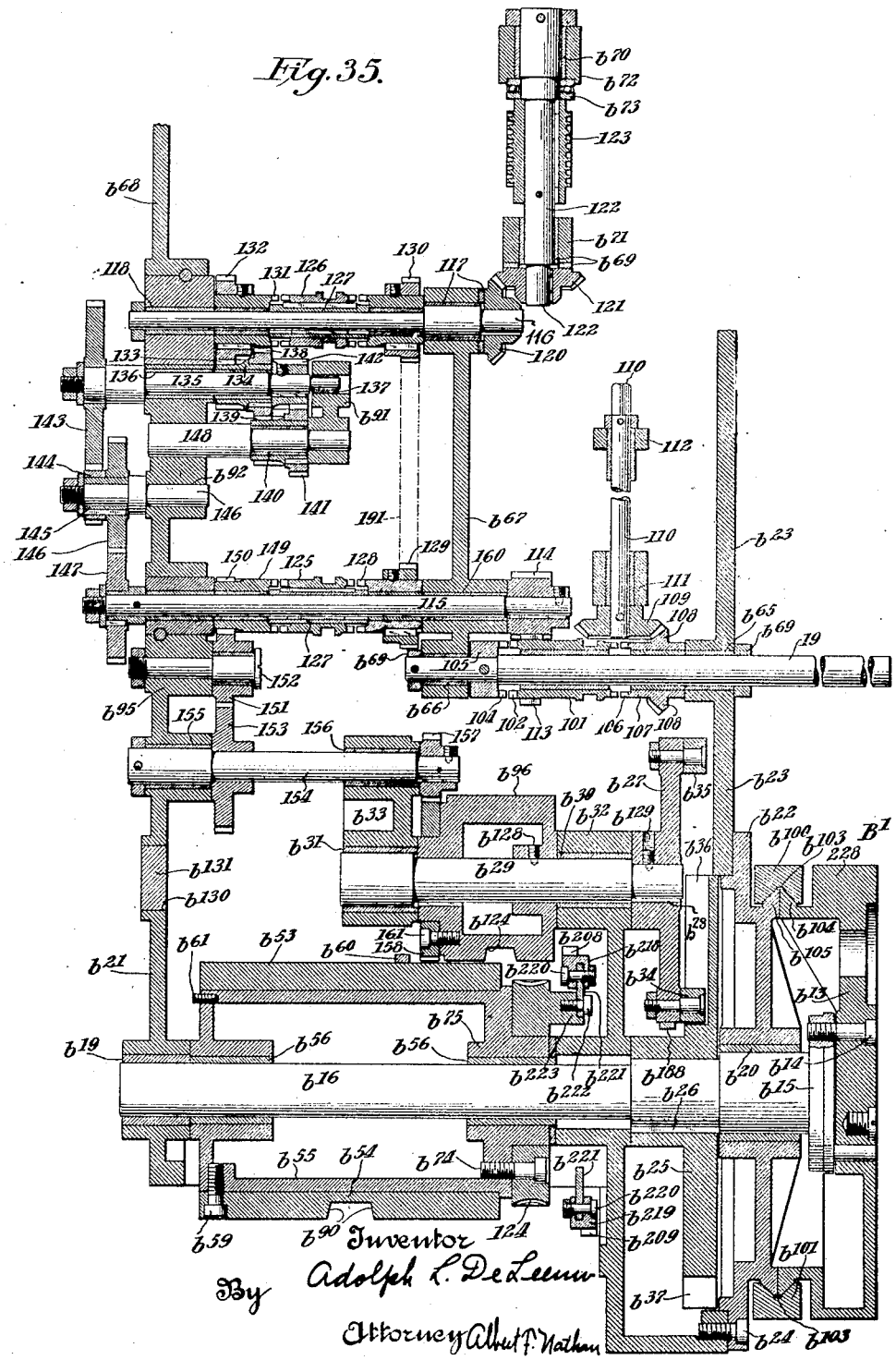

Patented Apr. 26, 1927.

1,626,187

UNITED STATES PATENT OFFICE.

ADOLPH L. DE LEEUW, OF PLAINFIELD, NEW JERSEY, ASSIGNOR TO THE GOSS AND DE LEEUW MACHINE COMPANY, OF NEW BRITAIN, CONNECTICUT, A CORPORATION OF CONNECTICUT.

THREADING MECHANISM.

Original application filed January 30, 1923, Serial No. 615,884. Divided and this application filed December 23, 1924. Serial No. 757,652.

This application is a division of one serially numbered 615,884 filed by me on January 30, 1923 and entitled Machine tool; the invention of this divisional application being directed to the proposition of cutting threads positively and perfectly in a given piece of work at the same time that other tooling operations are being performed either on that particular piece or on a companion piece.

In automatic machine-tools, provision is habitually made for accomplishing a preliminary relative movement between the tool-carrier and the work-carrier for the purpose of bringing the work and tool into proximity, whereupon the tool is caused to enter and form the work. Such machines often are required to cut threads in addition to performing other tooling operations and, to save time, it is essential that the threading should be done while the mechanism is operating in a manner compatible with its other functions. Heretofore, the tapping means has been impositive to the extent of depending upon the "self-feeding" properties of a tap. This has, however, resulted in a pronounced lack of precision due to an inability of the tap to take hold immediately and to feed itself without any lag and to continue to feed in, as well as out, without any departure whatsoever from the true lead of the thread. While this defect is exhibited more emphatically in work of the softer sorts of metal (when the threads are often stripped either completely in thin sections or are so weakened as to be useless) it is difficult even with stronger metal and thicker sections to secure threads in all of the standard pitches conforming to a high standard of precision.

Through this invention, however, the principle of "self-feeding" is abolished and a positive feed is made possible, so that a thread of any pitch may be cut in any grade of metal and in any section either thin or thick with absolute precision; all in an automatic multi-operation machine without disturbing its major cycle of operation and without increasing its normal period of operation as will appear hereinafter.

Among other important objects in the general reorganization which I have effected in the structure of automatic machines, is the construction and arrangement of several of the tool-spindles and their co-ordinate mechanism in a head-stock, while another of the spindles, preferably constituting a threading or reaming spindle, is carried independently by a head movable as a unitary structure along the bed of the machine, a feature which permits the use of the longest bed possible in the space available, or required by the extent of the article to be operated upon, and the limits of adjustment may be spaced much more widely than where the head is fixed, as in existing structures of this type.

A further important object of my improved organization of the work-supporting head and the tool-spindle head is the provision of means for positive correlation of the relative movements of these heads, by a liaison member which insures their co-action, and increases greatly the stability of the mechanism during treatment of the work, eliminating the tendency to chatter, and obviating much of the unnecessary wear upon tools and strain upon the working parts which has characterized machines of this class, the construction and arrangement of this novel liaison member being such as to provide for its automatic action.

My invention comprises numerous improvements in the structure of the mutiple tool-spindle head, among which improvements is the important provision for applying individual speed-change gears for each spindle, so that the speed of individual tools may be varied selectively, and that of each spindle at any time, without affecting the speed at which any other tool is driven, so that the speed of each spindle may be varied in accordance with the requirements of the work it is to perform at any time; as for example, in tapping operations, the tap can be driven at different speeds, by means of special change-speed gears, and external and internal threads can be formed at individually proper rates.

My improvements also provide for performing internal and external threading operations simultaneously, in a manner which is novel in chucking-machines.

In this connection I provide a novel means, preferably comprising positively acting lead-screw devices, to impart a positive feed to the threading or tapping-spindle, and I provide novel means to prevent relative motion between the turret-head and the threading-head, which is also advanced to its preliminary position positively by the sliding motion of the head carrying the threading spindle.

By this positive feed of the taps, I secure a firmness and accuracy in their operation which has only been possible heretofore in machines organized for chasing operations exclusively, and I have therefore made my reorganized chucking-machine more universal in its capabilities of use, tending also to obviate the need in a shop of special tapping apparatus for the type of work on which my machine is to operate.

In existing machines of this type, the reversing of the spindle used as a threading-spindle is done from the main cam-shaft, from which arrangement results the disadvantage that any change in the production time of the machine affects the setting of this spindle, and I have eliminated this disadvantage by fitting to a small drum, which revolves with the threading-spindle, the cam-dogs which control the movements of the latter, so that if the machine is set for ten threads on the work, it will make the ten threads regardless of whether the machine is running in ten seconds or fifty seconds.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
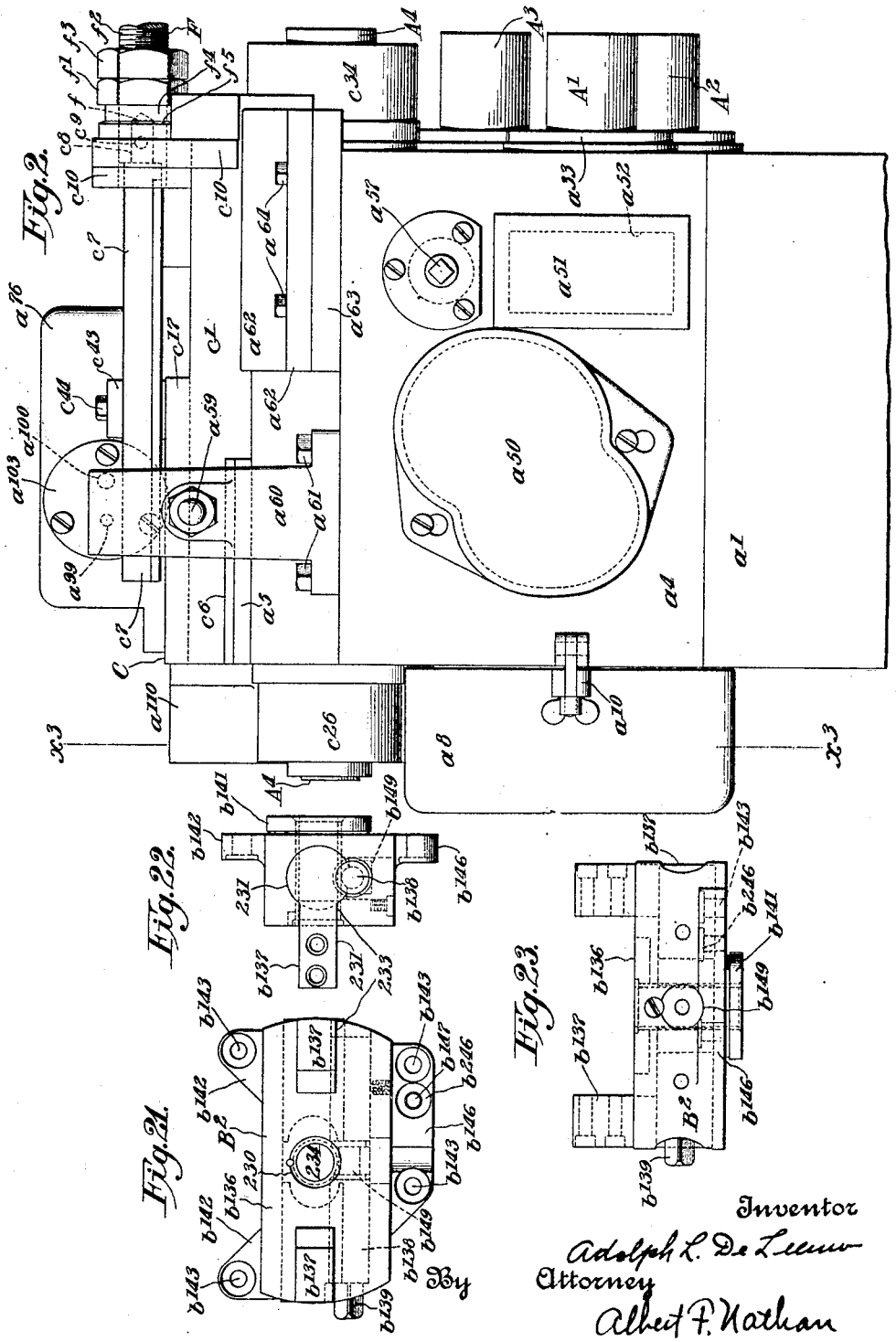
Figure 3:
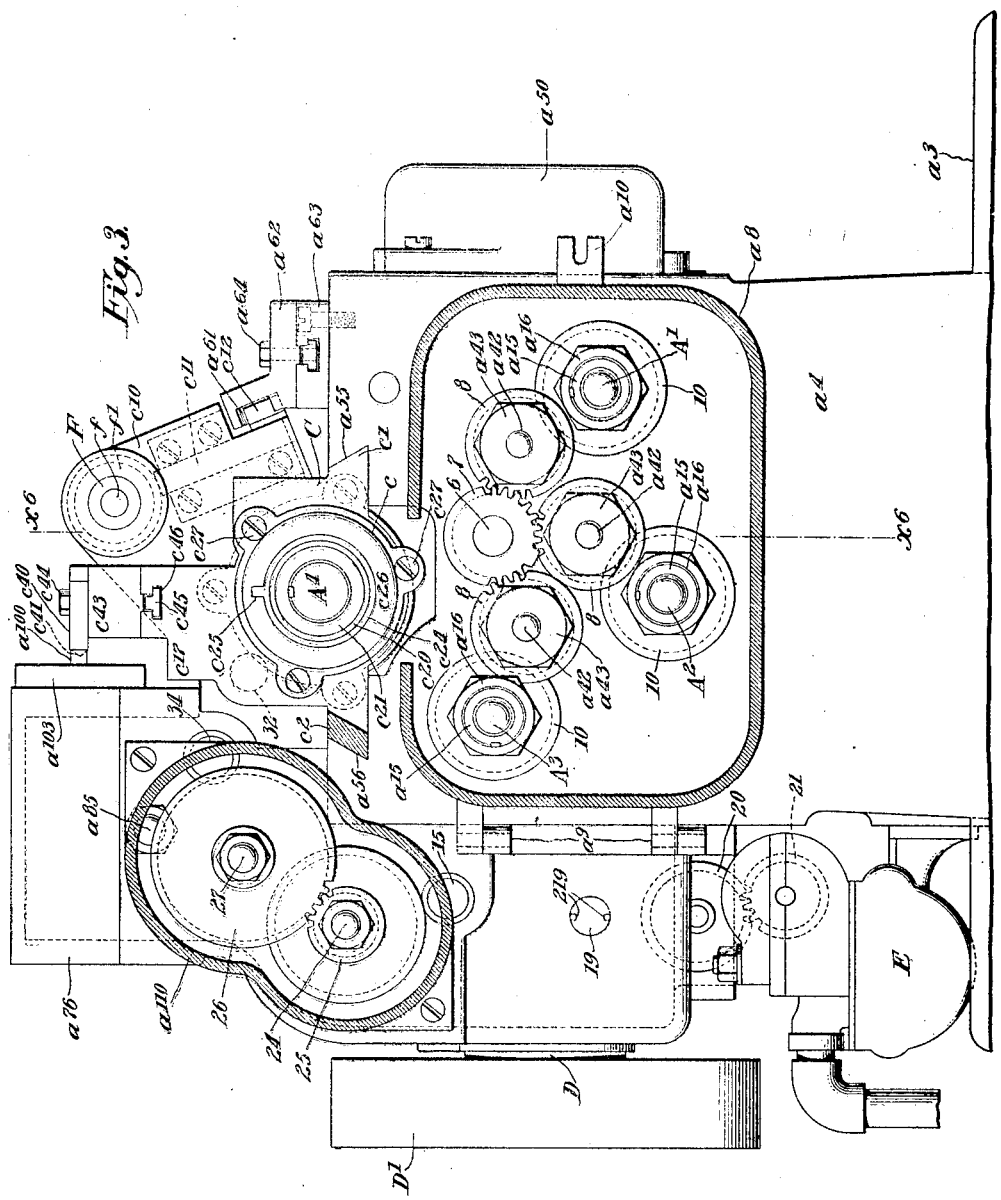
Figure 4:
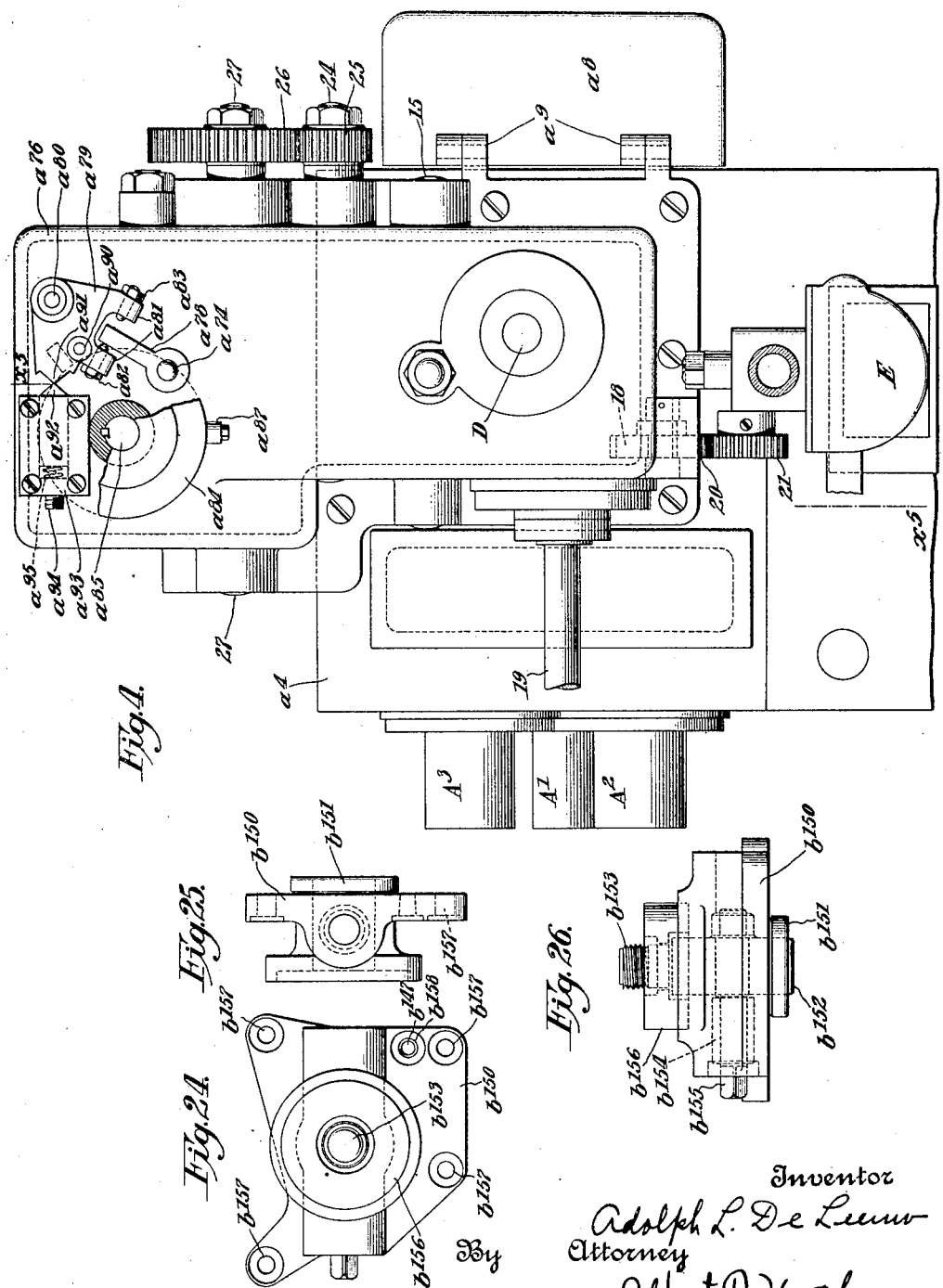
Figure 5:
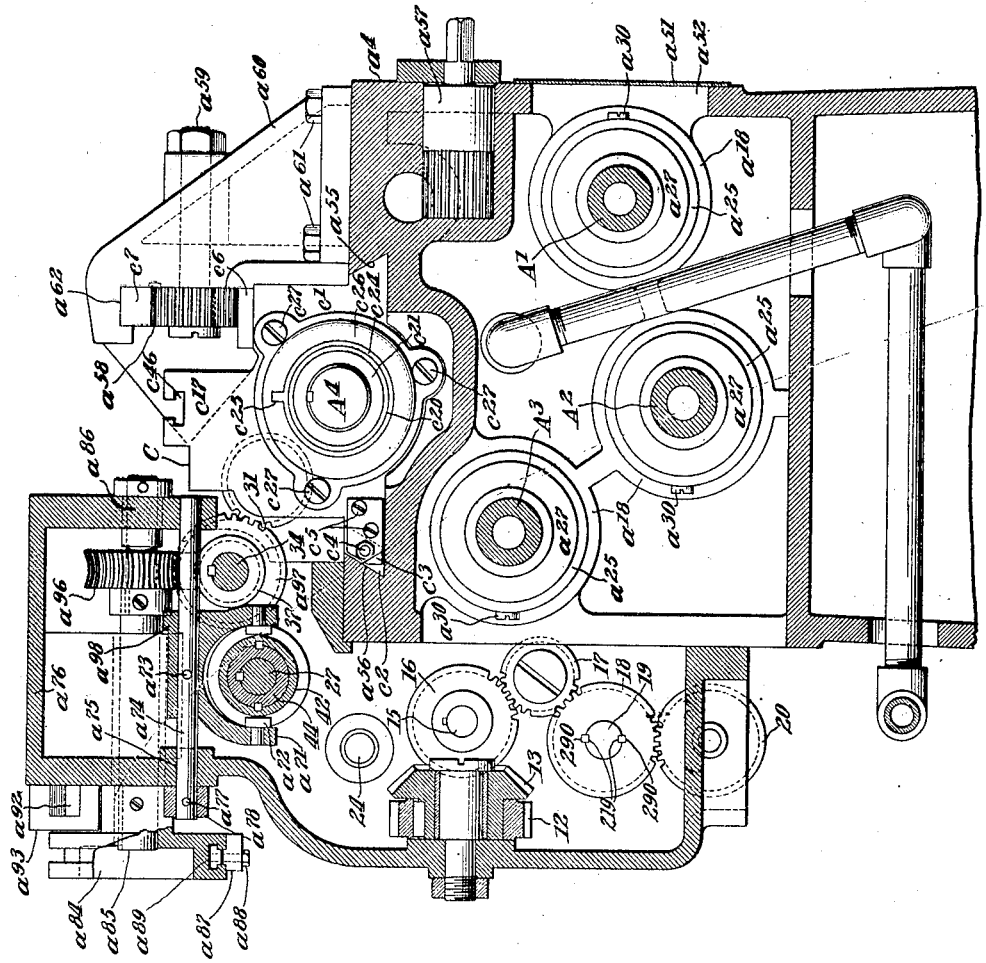
Figure 6:
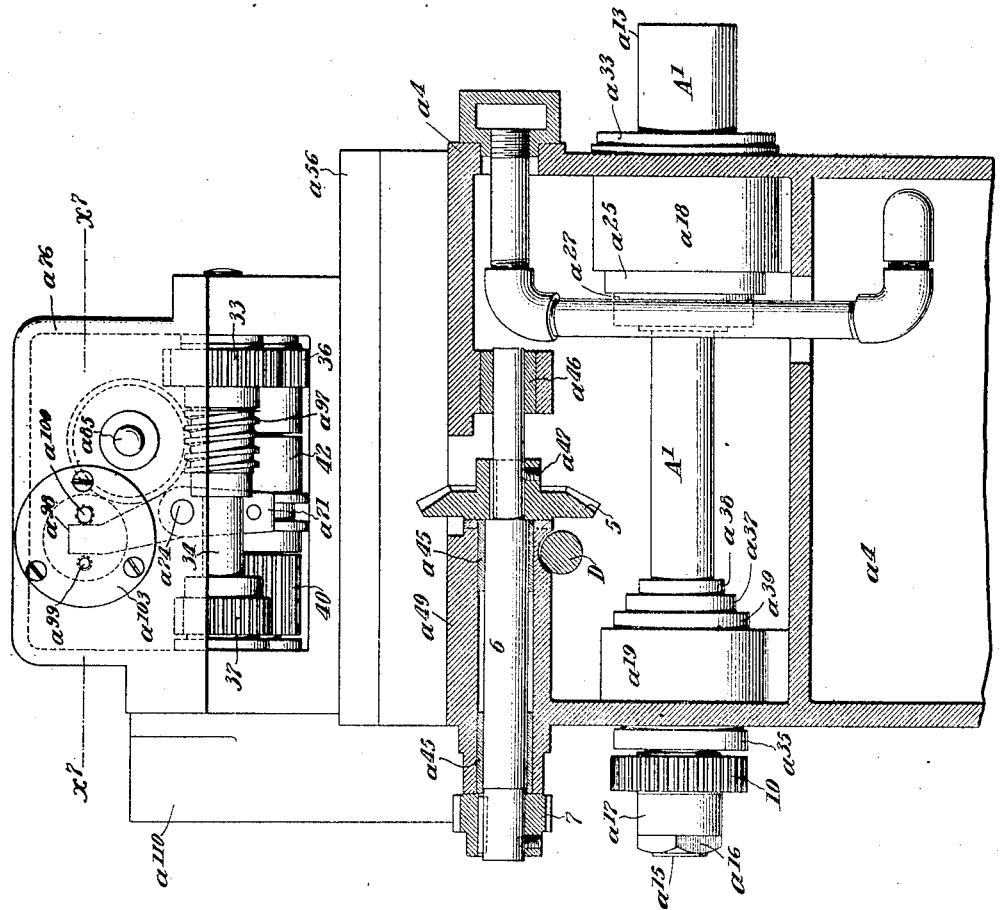

Fig. 1 is a view in front elevation of a multiple spindle automatic-metal-working machine in the nature of a chucking-machine and which embodies characteristics of this invention. Fig. 2 is a view in front elevation on an enlarged scale of the multiple-tool-spindle headstock, isolated. Fig. 3 is an end-elevation of the headstock, with portions of the cover, etc., shown in section, to reveal certain operating parts. Fig. 4 is a view thereof in rear elevation, with the driving-pulley removed. Fig. 5 is a vertical section, taken on the line $x^5$—$x^5$ of Fig. 4. Fig. 6 is a vertical section on the line $x^6$—$x^6$ of Fig. 3. Fig. 7 is a view in longitudinal section, taken on the line $x^7$—$x^7$ of Fig. 6, showing a spring-controlled detent, isolated. Fig. 8 is a plan view of a co-operating trip, also isolated, and partly broken away to reveal interior structure. Fig. 9 is a sectional development of the headstock gearing, to be described more at length hereinafter. Fig. $9^a$ is a similar view in continuation of Fig. 9. Fig. $9^b$ is likewise a view in continuation of Fig. 9. Fig. 10 is a fragmentary, sectional view of the pump drive-gear, and its supporting parts. Fig. 11 is a fragmentary, detail view of a substitute bearing for use in reaming operations. Fig. 12 is a view on an enlarged scale, in front-elevation, of the turret-head of the machine shown in Fig. 1, isolated, except that with the turret-head is shown the adjacent portion of the bed, parts being omitted and parts broken away to reveal interior structure. Fig. 13 is a plan view of the turret-head. Fig. 14 is an end-elevation thereof, showing also the adjacent portion of the bed, part of the casing being shown in section, to reveal gearing. Fig. 15 is a vertical section of the turret-head, taken on the line $x^{15}$—$x^{15}$ of Fig. 12, parts being broken away to reveal inner construction. Fig. 16 is an elevation of my preferred form of turret, the same being shown in place upon the turret-head, with chucking devices mounted in working position, parts being omitted and parts broken away to reveal more clearly the structure of the turret and chucking devices. Fig. 17 is a diametral, sectional view of the turret, taken on the line $x^{17}$—$x^{17}$ of Fig. 16, the turret being isolated with one of the chucking devices, shown in elevation. Figs. 18 and 19 are respectively views on a reduced scale in front elevation and side-elevation, respectively, of the isolated turret of Fig. 17, Fig. 20 being a diametral section thereof, on the line $x^{20}$—$x^{20}$ of Fig. 18. Figs. 21, 22 and 23 are respectively views in front-elevation, end-elevation and side-elevation, of the isolated chucking-device shown in Fig. 17. Fig. 24 is a view in front elevation of another form of chucking-device, isolated. Figs. 25 and 26 are views thereof in end-elevation and side-elevation, respectively. Fig. 27 is a fragmentary sectional view of the isolated clutch-operating mechanism. Fig. 28 is an elevation, taken in the direction of the arrow on Fig. 16, showing in isolated form a cover-plate which is shown at the left in Fig. 16. Fig. 29 is a similar view of the reverse side thereof. Fig. 30 is a longitudinal sectional view on the line $x^{30}$—$x^{30}$ of Fig. 29. Fig. 31 is a transverse, sectional view on the line $x^{31}$—$x^{31}$ of Fig. 29, and Figs. 32 and 33 are similar transverse, sectional views taken respectively on the lines $x^{32}$—$x^{32}$ and $x^{33}$—$x^{33}$ of Fig. 29. Fig. 34 is a fragmentary sectional view on the line $x^{34}$—$x^{34}$ of Fig. 28. Fig. 35 is a reversed, diametral section of the turret-head, showing the development of the operating mechanism.

In the illustrated embodiment of the invention, the metal-working machine in the nature of a chucking-machine assumes in general the form characteristic of automatic metal-working machines and, in accordance with my invention, is shown as comprising a bed A, with a work-supporting head B and a tool-spindle head C, mounted respectively in sliding relation to the bed and to each other.

The bed A may be of any suitable material, contour and dimensions required by the work to be performed, in accordance with my invention, and is shown as generally rectangular in plan, preferably tapering upwardly and outwardly from its base $a$ at the ends $a'$ and preferably sloping inward, slightly, along the lower portions $a^2$ of its front and rear, and having in its preferred form a drip-pan $a^3$ for lubricant, substantially co-extensive with its length, being preferably formed integrally with the bed structure, to avoid leaky joints and to afford greater simplicity and rigidity of structure, all in accordance with my invention.

Above the drip-pan $a^3$, rises a headstock $a^4$, formed integrally with the bed, or connected suitably therewith, and in this headstock are mounted rotatably a plurality of tool-spindles, of which there may be any suitable number, three being shown, designated respectively by the reference characters $A'$, $A^2$ and $A^3$, while at $A^4$ is shown another tool-spindle, mounted rotatably in bearings $c$, supported by the tool-spindle head C, the latter comprising also a slide $c'$ mounted on ways $a^5$ formed upon the headstock $a^4$.

The work-supporting head B is carried by a portion $a^6$ of the bed, rising above the drip-pan $a^3$, at a suitable distance from, and in opposed relation to, the headstock $a^4$, and this work-supporting head may be of any character suitable for effecting the portion of my invention relating thereto, its preferred form being that of a turret-head comprising a slide $b$ mounted upon ways $a^7$ with which the bed-portion $a^6$ is provided, and a turret B', with its co-ordinated instrumentalities arranged compactly within the turret-head in accordance with my invention, and which will be hereinafter described in detail.

*General organization of the operating mechanism.*

An important object of my invention is to organize the operating mechanism of my improved machine in such a novel fashion as to permit the actuation of its several instrumentalities, through a main driving-shaft, by a single source of power, such as a belt, or a motor, and in their general relationship the preferred arrangements for carrying this object into effect comprise a main driving-shaft D, (see Figs. 2, 3, 4, 9 and 9ª) which may be connected directly with a motor, or provided with a pulley D', to receive a belt $D^2$ running from a motor or any suitable source of power; the headstock $a$ containing also a set of gears and shafts (see Fig. 9ª) including gears 1, 2, shaft 3, bevel-gears 4, 5, shaft 6, and gears 7, 8, 9 and 10, to actuate the tool-spindles $A'$, $A^2$ and $A^3$; also a set of gears and shafts including pinions 11 and 12, bevel-gears 13 and 14, shaft 15, and gears 16, 17 and 18, to actuate the feed-shaft 19 for the turret-head and its co-ordinated mechanism, the gear 18 serving also, through gears 20 and 21 (see Figs. 3, 4 and 9) to actuate the cutting solution-pump E; also a set of gears and shafts including pinion 22, gear 23, shaft 24, and gears 25 and 26, to actuate the shaft 27, which constitutes the central shaft of a system to operate the tool-spindle $A^4$ and its co-ordinated mechanisms, which will be described in detail in the portion of this specification relating to that element of the machine.

As part of this general organization of my improved machine I have provided a novel liaison member F which serves to co-ordinate the sliding movements of the tool-spindle head C and the turret-head B, relatively to each other, the former deriving its feeding movements from the latter, as will be explained more fully.

From the above brief description, it can be understood readily that the operations of the machine are completely organized and co-ordinated, to permit the several instrumentalities to be actuated, through a main driving-shaft, common thereto, by a single source of power, such as a belt or a motor, insuring a complete harmony in their co-operation at all times, and completely avoiding the errors of machining, breakages of working parts, and delays for replacements and adjustments, which result necessarily from the employment hitherto of plural belts or plural motors for various instrumentalities.

*General and individual changes of speed.*

Before proceeding with detailed description of the component instrumentalities grouped in their general relationship as above, it may be noted briefly that I have provided for general speed-changes at several regions in the above general organization, notably at the region occupied by the gears 1 and 2, which may be exchanged in position to give a general change of speed for the tool-spindle actuating mechanism driven thereby, and in place of the gears 1 and 2 may be substituted change-gears of different relative sizes, to yield an extensive range of general speeds, while a further range of general speeds for the tool-spindles $A'$, $A^2$ and $A^3$ may be secured by exchanging their common actuating gear 7 for a gear of any appropriate size, and in connection therewith changing the intermediate gears 8, of which one is provided for each of the tool-spindles A', A², A³, (see Fig. 3). The speed of the individual tool-spindles A', A², A³ may be changed still further, independently of each other, and independently of any other instrumentality in the machine, by suitable changes of their individual sets of gears 9 and 10, (see Fig. 9ª).

Individual changes of speed for the tool-spindle A⁴ can be effected at the region of the gears 25 and 26, these changes being likewise independent of the speed of any other mechanism in the machine.

So also, independent changes of speed for the turret-head B and its co-ordinated instrumentalities can be effected, but the description of these changes will be made in the detailed description of the turret-head, it being sufficient to note that, in connection with the complete co-ordination of the several mechanisms of the machine, I have provided for a thorough system of general and independent speed-changes throughout the machine, so that the operator is not limited in any respect by the speed of one mechanism in securing the appropriate speed for any other mechanism, a novel and advantageous arrangement which I claim broadly for this type of metal-working machine, as the structure of existing chucking-machines precludes the possibility of such provision for such wide and independent ranges of speed as I have secured.

The tool-spindle headstock.

In accordance with an important object of my invention, I have provided for the complete enclosure within the headstock $a^4$ of the several tool-spindles A', A² and A³, and their co-ordinated mechanism, except for the portions thereof exposed for attachment of the selected tools, and I have provided also for suitable enclosure of the change-speed gears, as by a cover $a^8$, hinged to the headstock at $a^9$, and provided with a locking device $a^{10}$, and this novel provision for enclosure of the plural tool-spindles of such a machine is not limited in its application by the number, specific structure or relative positions of the tool-spindles, all of which may be varied in accordance with the exigencies of the work to be performed in particular installations or embodiments of my invention, the primary object achieved being two-fold, viz, first, to avoid overhang of the working parts, and the weakness and instability of structure incidental to such overhang, and secondly to leave no parts exposed to endanger the operator, or distract his attention, or to be damaged by blows or the intrusion of extraneous objects, such as wrenches, bits of metal or the like.

In carrying these objects into effect, any suitable type of spindle may be employed, and the spindles A', A², A³ are of as well-known type, in general structure, similar to each other, and a general description of one will suffice, particular reference being had to Fig. 9ª, which shows enough of one of the spindles and its co-operating bearings to permit a thorough understanding of each spindle, regardless of the number employed.

The tool-spindle A', selected for illustration, comprises a shaft A¹, preferably having an axial bore $a^{11}$, in continuation of the usual socket $a^{12}$ to receive the tool, and the head $a^{13}$, in which this socket is formed, constitutes the only exposed portion of the spindle, preferably, in accordance with my invention, only enough of this head projecting to permit the provision of the usual keyway $a^{14}$, while at the other end the spindle extends sufficiently only to afford an adequate seat $a^{15}$ for the spindle-driving gear 10, its retaining nut $a^{16}$ and a spacing-ring $a^{17}$, designed to maintain the nut $a^{16}$ in accessible position clear of the teeth of gear 8, the positions of the respective gears 7, 8, 9 and 10, at the extreme left end of the machine, being most convenient for gear-changing, (see Fig. 3).

In accordance with my invention, the spindle-bearings are confined within the limits of the headstock $a^4$, suitable bosses, $a^{18}$ and $a^{19}$, being provided, preferably, integral with the headstock walls, to receive co-operating tapered bearings parts $a^{20}$ and $a^{21}$ at the head end, and $a^{22}$, $a^{23}$ at the gear end. The bearing member $a^{20}$ is preferably split longitudinally, and fits snugly upon a reduced portion $a^{24}$ of the spindle-shaft, and compensation for wear can be effected by means of a nut $a^{25}$ screwed upon the threaded shank $a^{26}$ thereof, this nut being seated against the inner end of the boss $a^{18}$, and serving to prevent outward end-shake of the spindle, through the medium of a collar $a^{27}$ fastened by a set-screw $a^{28}$ upon the spindle, with an intervening washer $a^{29}$. A set-screw $a^{30}$ serves to prevent rotation of the nut $a^{25}$, and a pin $a^{31}$ serves to prevent relative rotation of the bearing members $a^{20}$ and $a^{21}$. Inward end-shake of the spindle is prevented by the spindle-head shoulder $a^{32}$, engaged with the outer end of the bearing member $a^{20}$, and a protecting ring $a^{33}$, secured by screws $a^{34}$, is shown to keep particles of dust and metal from the bearings.

At the gear-end bearing, the nut $a^{35}$ serves to take up wear on the split bearing-member $a^{22}$, and the pin $a^{36}$ prevents relative rotation of the members $a^{22}$ and $a^{23}$, while the principal thrust upon the spindle-shaft A' is taken up by a ball-bearing $a^{37}$ interposed between a shoulder $a^{38}$ on the spindle-shaft A¹ and a cup $a^{39}$, the latter being seated against the boss $a^{19}$ of the headstock, and pinned at $a^{40}$ to the bearing-member $a^{23}$.

The structure of the above-described parts renders them easily adjustable and removable, and similarly, upon removal of the nut $a^{41}$, the post $a^{42}$ can be removed, with the gears 8 and 9 and their retaining nut $a^{43}$ and washer $a^{44}$; also the shaft 6 can be withdrawn from its bearings $a^{45}$, $a^{46}$, after loosening the set-screw $a^{47}$ in the hub of bevel-gear 5, to which access is provided by an aperture $a^{48}$ in the headstock member $a^{49}$, other operating parts of this structure being likewise accessible and removable, as will be readily understood by skilled mechanics, from the indications in the drawings. Access to the general change-speed gears 1 and 2, and the pulley-shaft D and intermediate shaft 3, is secured by removal of the cover-plate $a^{50}$, shown in Fig. 2, and a similar cover-plate $a^{51}$ masks a hand-hole $a^{52}$ which gives access to the head-end bearing of spindle A'.

The tool-spindles A', $A^2$, and $A^3$ may be used for any purpose for which such spindles are usually employed, and owing to their unusually solid support, and protected character, their performance will be much more accurate, and their life longer, than that of spindles similarly employed in existing machines.

Sliding-tool-spindle head.

An object of very great importance in my invention is to provide a tool-spindle head mounted in sliding relation to the bed and to the turret-head or work-supporting member, whether the latter be mounted slidingly on the bed, or in fixed relation thereto, and I contemplate the provision of such a head with one or a plurality of spindles, and while the instance selected for illustration and description in my present application shows the sliding tool-spindle head C as provided with a single tool-spindle $A^4$, and I reserve the right to claim specifically in another application such a sliding tool-spindle head provided with plural spindles, it is to be understood that I regard the provision of a plurality of tool-spindles upon a sliding head or a plurality of sliding heads, in a machine of this nature of a chucking-machine, as within the spirit of my present invention, and as covered broadly by claims herein.

In effecting this object of my invention, any suitable structure may be employed, and as one convenient form of construction I have shown the tool-spindle head C as comprising a slide $c'$ mounted in ways $a^{55}$ and $a^{56}$, preferably formed integrally with the headstock $a^4$, in parallelism with the axes of the spindles A', $A^2$ and $A^3$, the slide $c'$ being shown as approximately equal in length to the width of the headstock, and the tool-spindle $A^4$ being of slightly greater length than that of the spindle A' already described, although its dimensions and structure may vary in accordance with the requirements of particular installations.

The form of slide illustrated fits snugly the way $a^{55}$ at one side thereof, preferably, while at the other way $a^{56}$ I have shown a tapered gib $c^2$, having an end-plate $c^3$ with an adjusting screw $c^4$, and screws $c^5$ by which the plate and gib are connected to the end of the slide $c^1$, this form of adjustment being well-known and not requiring further explanation; and a well-known form of manually operable work-centering spindle with a rack-and-pinion feed $a^{57}$ may be fitted to the headstock, as indicated in Fig. 5, the spindle being omitted.

Liaison of the heads.

In accordance with an important object of my invention, I provide means to feed the tool-spindle head C automatically, and to co-ordinate its movements relatively to those of the work-supporting head B, whether the latter be of the turret-head type selected for illustration and description, or a movable head of some other type suitable to co-operate with my improved sliding tool-spindle head.

Such feeding means may be of any suitable character to accomplish the desired co-ordination of the head, and as one convenient form of structure, particularly advantageous in reaming operations, for example, I have shown a double-rack and pinion feeding device, comprising a rack $c^6$, fast upon the slide $c^1$, and with which meshed a pinion $a^{58}$ bolted rotatably at $a^{59}$ to a bracket $a^{60}$ secured by bolts $a^{61}$ upon the headstock $a^4$, the pinion meshing also with a second rack $c^7$ which slides in reversed ways $a^{62}$ at the top of the bracket $a^{60}$, movement of the rack $c^7$ toward the left in Fig. 1, or toward the observer in Fig. 5, serving to cause movement of the slide $c^1$, and its spindle $A^4$, toward the work-supporting head B, while reversed movement of the rack $c^7$ causes the slide $c^1$ and spindle $A^4$ to be pulled back from the head B.

To effect this movement of the rack $c^7$, I have provided means to connect the rack $c^7$ with the head B, the preferred form of such means being shown as a liaison member F comprising a rod secured non-rotatively to the head B at $b^2$, and having at its other end a socket $f$ (see Fig. 2) which receives a reduced extension $c^8$ of the rack $c^7$, secured in place by a pin $c^9$, so that the liaison member F and the rack $c^7$ move to and fro with the head B at all times, as long as the rack is in place, and consequently the slide $c^1$ and tool-spindle $A^4$ advance toward the head B at the same rate that the head B advances toward the headstock, and vice versa, and therefore the tool carried by the spindle $A^4$ meets the work carried by the head B halfway, so that it is only necessary to move the head B half the distance, to commence operation upon the work, and thus a reaming operation, for example, can be accomplished much more rapidly than with existing chucking machines.

Such a mode of feeding is novel in machines of this type, and as such it is claimed broadly by me.

For use in threading and tapping operations, I prefer to remove the rack $c^7$ and to provide novel means for locking the liaison-member automatically in the proper position to cause it to act as a tie-rod, linking the heads B and C together in fixed relation while the tool is operating on the work, to avoid destructive strains and to insure accuracy of treatment during such operations as tapping, which requires the work to be held very positively and firmly, a requirement which existing machines of the chucking-type have failed to meet, so that ordinarily it has been necessary to carry out such operations on a separate tapping-machine, specially constructed for the tapping operation, entailing loss of time for transfer of the work, and additional expense for space and upkeep of the special tapping, or the diversion of such machines from other work.

As one suitable form of such locking means, I have provided an abutment $c^{10}$ upon the slide $c^1$, and a co-operating threaded abutment collar $f^1$, adjustable upon a threaded portion $f^2$ of the rod F, with a jam-nut $f^3$ to hold the collar in adjusted position, the adjustment being effected by the operator when setting up the work, so that when the head B has presented the work at the proper position for operation thereon by a tap, for example, the collar $f^1$ will be in contact with the abutment $c^{10}$, as shown in Fig. 2. I provide means to lock the collar in this position, and simultaneously to cramp it against the abutment, for which purpose I have shown (see Fig. 3) a bolt $c^{11}$ mounted in upright sliding position within the abutment $c^{10}$, as shown in Fig. 3, this bolt having a roller $c^{12}$ taking into a cam groove $a^{61}$ in a plate $a^{62}$ bolted upon a base $a^{63}$ mounted on the headstock $a^4$ to which the plate $a^{62}$ may be secured in adjusted position by a T-headed bolt $a^{64}$.

The cam-plate $a^{62}$ is so set by the operator that as the collar $f^1$ reaches the position shown in Fig. 2, the roller $c^{12}$ will have ridden up to the high point of the cam-groove $a^{61}$ in the cam-plate $a^{62}$, forcing the bolt $c^{11}$ into a groove $f^4$ of the collar $f'$, this groove having a beveled wall $f^5$ against which the head of the bolt $c^{11}$ works, cramping the collar $f'$ firmly against the abutment $c^{10}$ and thereby tying the heads B and C together so that they move in unison until release of the collar $f'$ is effected by withdrawal of the bolt $c^{11}$ as the regular pull-back movement of the head B is initiated and the head B draws with it the rod F and head $C^7$, the consequent movement of the slide $c'$ carrying with it the abutment $c^{10}$, and the roller $c^{12}$ rides off the high-point of the cam-plate groove $a^{61}$ and the bolt $c^{11}$ releases the collar $f'$, which is then free to retreat with the rod F under the pull of the head B.

When it is desired to avoid operation of the locking-bolt $c^{11}$, the collar $f'$ can be run along the threaded portion $f^2$ of the liaison-member F, toward the turret-head B, far enough to permit free sliding movement of the member F through the abutment $c^{10}$ without engagement with the collar $f'$ by the bolt $c^{11}$, which latter can still move freely, and this will usually be done when the tool-spindle $A^4$ is employed for tapping operations. At such times it is not necessary to utilize the counter-sliding movement of the tool-spindle head C, and the rack $c^7$ can be disconnected from the member F by removal of the pin $c^9$, leaving the head C free from connection with the head B.

So also, if desired, the liaison-member F can be removed from the head B.

*The threading, tapping and reaming spindle.*

Whether the liaison-member F be thus removed, or disconnected from the rack $c^7$, in tapping, or connected for counter-operation of the head C by the head B, in reaming, the mechanism for rotating the tool-spindle $A^4$ can be operated at all times, in accordance with my invention, and I will now describe the preferred form of such mechanism, it being understood that any construction may be employed, suitable for such actuation, and that any suitable form of tool-spindle may be employed in place of the tool-spindle $A^4$ selected for illustration and description.

As one convenient and suitable form of spindle, and actuating mechanism therefor, to carry into effect my improvements in the operation of a tool-spindle carried by a sliding tool-spindle head, I have shown a tool-spindle $A^4$ of such construction as to render it capable of performing not only the ordinary operations, required of such tool-spindles in machines of this general type, more efficiently than similar tool-spindles in existing machines, but also of performing with particular and novel efficiency such specialized operations as threading, tapping and reaming, and notably for accomplishing in a single operation the formation of exterior and interior threads upon an article presented by the work-support.

Accordingly, in its preferred form, as illustrated, with special reference to Fig. 9, the tool-spindle $A^4$ comprises a hollow shaft $c^{14}$, supported at $c^{15}$ and $c^{16}$ in bearings carried by a part $c^{17}$ of the sliding-head C, and deriving its rotative movement from the shaft 27 through a set of gearing and shafts, including a gear 30, fast upon the shaft $c^{14}$, and which meshes with a long pinion 31 mounted rotatably upon a shaft 32 supported in sockets $c^{18}$ of the sliding-head member $c^{17}$, this pinion meshing with a gear 33 fast upon a shaft 34 mounted in bearings 35 carried by a portion $a^{70}$ of the headstock $a^4$, the gear 33 meshing also with a gear 36 mounted loosely upon the shaft 27, which, as already noted briefly, constitutes the main-actuating shaft for the tool-spindle $A^4$. The shaft 34 is shown as provided also with a gear 37 fast thereon, and the gear 37 is in mesh with an intermediate gear 38 mounted on a stud 39 carried by the headstock member $a^{70}$, the gear 38 meshing in turn with a pinion 40 mounted loosely upon the shaft 27, this pinion 40, and the gear 36 having clutch-teeth 41 respectively, for engagement alternatively with co-operating teeth upon a sliding clutch-member 42 splined at 43 upon a sleeve 44 which is fast upon the shaft 27, and this clutch-member 42 can occupy the neutral position shown, in which it rotates with the shaft 27 without actuating the tool-spindle $A^4$, or it can be moved to the right into engagement with the clutch-teeth 41 of gear 36 to rotate the tool-spindle $A^4$ in one direction, or can be moved to the left into engagement with the clutch-teeth 41 of the pinion 40, to rotate the spindle $A^4$ in reverse direction, the gears 36 and 33 being used ordinarily in the operation of forming right-handed threads, and the gears 40, 38, 37 in forming left-hand threads, as either set will serve for reversal when the other set is performing the selected operation.

In accordance with an important object of my invention, I have provided self-feeding devices formed as a component part of the structure of the spindle $A^4$. These devices may be of any suitable construction to effect this object, and as one convenient form I have shown the spindle-shaft $c^{14}$ as provided with an exteriorly threaded collar $c^{20}$ splined upon the left-hand end of the shaft $c^{14}$ and there secured by a nut $c^{21}$ mounted upon the reduced threaded portion $c^{22}$ of the shaft $c^{14}$ the latter having a shoulder $c^{23}$ to serve as an abutment for the threaded collar $c^{20}$. Surrounding this portion of the shaft $c^{14}$, and to co-operate with the threaded collar $c^{20}$, is an internally threaded bushing $c^{24}$ splined at $c^{25}$ in a boss $c^{26}$ secured by screws $c^{27}$, to the member $c^{17}$ of the tool-spindle head C, the action of these co-operating threaded members $c^{20}$ and $c^{24}$ being to advance the spindle-shaft $c^{14}$, and the tool (not shown), relatively to the head C when the spindle-shaft $c^{14}$ is rotated counter-clockwise by action of the shaft 27 through clutch-member 42, gears 36 and 33, long-pinion 31, and spindle-shaft gear 30, when the clutch-member 42 has been coupled with the teeth 41 of the gear 36, by mechanism which will be described hereinafter. Conversely, when the clutch 42 has been thrown into couple with the teeth 41 of the pinion 40, the latter acts through gears 38 and 37, shaft 34 and gear 33, long-pinion 31 and gear 30, to drive the spindle-shaft $c^{14}$ in reverse rotation, and thereupon the threaded members $c^{20}$ and $c^{24}$ co-operate to cause reverse or leftward axial movement of the shaft-spindle $c^{14}$ and its tool.

While a single set of co-operating threaded members such as those described at $c^{20}$ and $c^{24}$ will suffice ordinarily to accomplish this self-feeding action of the tool-spindle $A^4$, I prefer to provide also another and similar set of co-operating threaded members, at the other end of the spindle-shaft $c^{14}$, which I have shown as having an auxiliary spindle-sleeve $c^{27}$, splined at $c^{28}$ upon the shaft $c^{14}$ so that it will rotate therewith, but free to move lengthwise thereupon when certain operations are to be performed, such as double-threading, that is to say when the tool-spindle $A^4$ is to be used, in accordance with an important object of my invention, to form interior and exterior threads simultaneously at a single operation.

The auxiliary set of threaded members which I will now describe are of particular service for use in performing such a double-threading operation, and in their preferred form, they comprise an exteriorly threaded collar $c^{29}$ splined at $c^{30}$ upon the tool-carrying end $c^{31}$ of the spindle-sleeve $c^{27}$, and a co-operating interiorly threaded bushing $c^{32}$ splined at $c^{33}$ within a boss $c^{34}$ secured by screws $c^{35}$ to the supporting member $c^{17}$ of the tool-spindle head C, the action of the threaded members $c^{29}$ and $c^{31}$ being to cause independent advancing movement of the spindle-sleeve $c^{27}$ with its tool, (not shown) relatively to the spindle-shaft $c^{14}$ and its tool, for the attachment of which latter tool (not shown) the spindle may be provided with the usual tool-socket $c^{36}$ having a groove at $c^{37}$ for tool-setting means. At $c^{38}$ I have shown a spacing-ring to hold the bushing $c^{32}$ at the proper position thereof, near the mouth of the boss $c^{34}$.

When the tool-spindle $A^4$ is rotated counter-clockwise, the shaft $c^{14}$ advances under the action of the co-operating threaded members $c^{20}$ and $c^{24}$, as already described, and the spindle-sleeve $c^{27}$ advances, under the action of the co-operating threaded members $c^{29}$ and $c^{32}$, at a rate that may be greater or less than the rate of feed of the shaft $c^{14}$, or at the same rate, according to the structure of the threaded members respectively, which may be varied in correspondence with the work to be performed.

When performing operations not of a double character, such for example as forming single threads, or reaming, the boss $c^{31}$ may be removed, with the auxiliary feeding-members $c^{32}$ and $c^{29}$, also the spacing-ring $c^{38}$, and a set-screw $c^{39}$, may be applied, in the position illustrated, to secure the spindle-sleeve $c^{27}$ against lengthwise movement on the spindle shaft $c^{14}$, so that the shaft and sleeve will both rotate and feed in unison, and the tool-attaching portions of the spindle and sleeve will be freed from unnecessary appendages.

In reaming operations, I may remove also the threaded collar $c^{20}$ and threaded bushing $c^{24}$, encased in the boss $c^{26}$, and substitute therein a thrust-bearing of the type shown in Fig. 11, in which an anti-friction collar $c^{40}$ is mounted between two rings $c^{41}$ on the reduced end $c^{22}$ of the spindle-shaft $c^{14}$, the rings being clamped between the shoulder $c^{23}$ and nut $c^{21}$, in place of the collar $c^{20}$ heretofore described, end-shake toward the right by the spindle-shaft $c^{14}$ being prevented by a spacing-ring $c^{42}$, while the principal thrust due to the reaming operation is taken up by the flange $c^{43}$ of the boss $c^{26}$, against which the collar $c^{40}$ bears.

The tool-spindle $A^4$ is thus adapted by its structure to perform a wide range of operations, with but few adjustments, and in its relationship to the sliding tool-spindle head B, it brings to these operations in general the advantageously rapid and facile co-ordinated advancing movements of work-support and tool yielded by the double-rack-and-pinion mechanism already described, which saves much waste of time in preliminary operations, while it makes possible also a more rapid feed during actual reaming operations, than in boring operations, and without consequent speeding-up of rotation, which can be effected as slowly or rapidly as desired, owing to the wide range of speed-changes for which I have made provision at the region of gears 25 and 26, these being very accessible from the left end of the machine, enclosed by a cover shown in section at $a^{110}$ in Fig. 3, and being entirely independent of the other speed-changing devices, throughout the machine.

A very great advantage of my novel arrangement of tool-spindle on a sliding-head in a chucking-machine emerges in its increased stability in operation, as compared with existing machines, in which the spindles are advanced to such an extent beyond their bearings that the overhang is destructive, while in accordance with my arrangement of structure above described, the bearings, being mounted on the sliding head, are advanced with the spindle, and similarly the self-feeding devices do not involve extended overhang of the spindle in its most advanced position. This advantage, coupled with the unparalleled firmness with which the work and tool are held together by the liaison member, constitutes this apparatus a specifically new type, and to this effect I contribute further by my novel provision for automatic control of the tool-spindle $A^4$ in its recurrent operative cycle, this control-system being centered in the clutch-member 42 on the shaft 27, to which reference has been made.

*Automatic threading spindle-control system.*

The clutch 42 can be operated by any suitable mechanism, and I have shown one suitable form of such mechanism, especially designed to effect my improved automatic control of the operation of such a tool-spindle as $A^4$, this preferred structure comprising a yoke $a^{71}$ (see Fig. 5) with clutch-engaging rollers $a^{72}$, the yoke $a^{71}$ being pinned at $a^{73}$ upon a rock-shaft $a^{74}$ mounted in bearings $a^{75}$ carried by the part $a^{76}$ of the headstock $a^4$. The yoke $a^{71}$ is also provided with an arm $a^{98}$ (broken away in Fig. 5, but shown in dotted lines in Fig. 6, in which figure the sliding-head C is omitted to reveal the clutch and its associated structure) which arm $a^{98}$ extends upward within the headstock part $a^{76}$, adjacent to a controlling-device comprising a plurality of plungers $a^{99}$ and $a^{100}$ mounted respectively to slide in sockets $a^{101}$ and $a^{102}$ of a plug $a^{103}$ which is shown in elevation in Figs. 2 and 6, and in an isolated sectional view in Fig. 7. In the position of the parts illustrated in Figs. 6 and 7 the clutch 42 is held in the neutral position shown in Fig. 9 with the arm $a^{98}$ of the yoke $a^{71}$ resting against the extended inner end of the plunger $a^{99}$, which is normally held so extended by a coil-spring $a^{104}$, while the plunger $a^{100}$ is held in reversely extended position by the action of a pinion $a^{105}$ interposed rotatively between rack-teeth $a^{106}$ and $a^{107}$ formed on the plungers respectively, the forward end of the plunger $a^{100}$ being bevelled as indicated at $a^{108}$.

This bevelled end of the plunger $a^{100}$ normally stands in the path of a co-operating member shown in elevation, in Fig. 3, and in plan, isolated, in Fig. 8, comprising a trip-lever $c^{40}$ having a bevelled end $c^{41}$ to be engaged with the bevelled end $a^{108}$ of the plunger $a^{100}$, as the trip-lever $c^{40}$ is carried to and fro by the sliding tool-spindle head C, upon which the trip-lever $c^{40}$ is mounted pivotally at $c^{42}$, having a bearing-block $c^{43}$ secured adjustably by a tie-bolt $c^{44}$ whose head $c^{45}$ lies (see Fig. 3) in a T-slot $c^{46}$ in the upper face of a pedestal $c^{47}$ forming part of the sliding tool-spindle head C.

The plug $a^{103}$ can be turned through 180° when used in left-hand threading, the operation of the plungers $a^{99}$ and $a^{100}$ being thus reversed.

When the tool-spindle head C is drawn toward the right by the pull-back movement of the turret-head B, which acts through the liaison member F, in the collar $f'$ and abutment $c^{10}$ in the manner already described, the bevelled end $c^{41}$ of the trip-lever $c^{40}$ is engaged with the bevelled end $a^{108}$ of plunger $a^{100}$ and the trip-lever $c^{40}$ turns on its pivot $c^{42}$ freely until the tail $c^{47}$ of the trip-lever engages a plunger $c^{48}$ held outward normally by a coiled spring $c^{49}$, which yields sufficiently to allow the bevelled end $c^{41}$ of the trip-lever to ride over the bevelled end $a^{108}$ of plunger $a^{100}$ without forcing the latter inwardly, the plunger $c^{48}$ then imparting to the lever $c^{40}$ a kick which throws the lever $c^{40}$ back into the position shown in Fig. 8, with its bevelled end $c^{41}$ ready to engage and operate the bevelled end $a^{108}$ of plunger $a^{100}$, upon the reverse movement of the slide $c'$, the arm $a^{98}$ meanwhile retaining its central position shown in Fig. 7, engaged with the slabbed side of plunger $a^{99}$, which insures the maintenance of the clutch-member 42 in neutral position, and as long as the plunger $a^{99}$ stays in the position shown in Fig. 7, it holds the clutch-arm $a^{98}$ from movement toward the left in Fig. 6, and accordingly the clutch-member 42 cannot be thrown into engagement with the teeth 41 of gear 36, (see Fig. 9) but can be thrown into engagement with the teeth 41 of pinion 40, inasmuch as the plunger $a^{100}$ is out of the path of the arm $a^{98}$ (see Fig. 7).

The rock-shaft $a^{74}$ which carries the yoke-lever $a^{71}$ and its controlling-arm $a^{98}$, above described, has also pinned upon its outer end at $a^{77}$ (see Figs. 4 and 5) an arm $a^{78}$, with which co-operates a lever $a^{79}$ mounted pivotally at $a^{80}$ upon the head-stock portion $a^{76}$ and having arms $a^{81}$ provided with adjustable tappet-pins $a^{82}$ and $a^{83}$ arranged to engage the arm $a^{78}$ upon opposite sides, the lever $a^{79}$ having also a bevelled nose $a^{91}$ engaged with the bevelled nose $a^{92}$ of a plunger mounted in a casing $a^{93}$ and pressed normally toward the lever $a^{79}$ by a spring $a^{95}$, regulated by a set-screw $a^{94}$, these parts occupying the position shown in Fig. 4, with the bevelled noses slightly off the mid-position, when the yoke-arm $a^{98}$ is in its mid-position shown in Figs. 6 and 7, and the clutch-member 42 is in neutral position, the spring $a^{95}$ tending; through lever $a^{79}$, pin $a^{82}$, arm $a^{78}$, rock-shaft $a^{74}$, and yoke $a^{71}$, to throw clutch-member 42 into couple with gear 36 when arm $a^{98}$ is released by plunger $a^{99}$.

*Operative cycle of the tool-spindle $A^4$ for reaming.*

Starting with the sliding tool-spindle head C in the position shown in Fig. 1, (the collar $f'$ having been run farther to the right than shown in Fig. 1), if the sliding work-support B (whether in the nature of a turret-head, as illustrated, or other form of work-support suitable to co-operate with such a sliding-tool spindle-head) is advanced toward the headstock $a^4$, the liaison-member F pushes the rack $c^7$ toward the left, rotating the pinion $a^{58}$ (see Fig. 5) and thereby causing the rack $c^6$ to run toward the right, drawing with it the slide $c^1$ and the tool-spindle $A^4$ until the reaming tool thereby carried is in position to operate upon the work-piece supported, say, in the chuck $B^2$; which has been brought forward to a medial position, by the advance of the head B, to meet the rotating tool.

*Threading cycle.*

The first phase, is commenced by removing the rack $c^7$, setting up the work and tool, and advance of the work-support B and head C toward each other, during which time the tool-spindle $A^4$ and its rotation-controlling drum $a^{84}$ are idle, being as yet uncoupled by clutch-member 42. At the end of this phase, the liaison member F is locked by action of the bolt $c^{11}$ as hereinbefore described, to prevent relative movement of the heads B and C, under working strains and to prevent modification of the lead.

The second phase is initiated when the head C continues its leftward movement, pushed by the rod F, and the bevelled end $c^{41}$ of the dog $c^{40}$ strikes the bevelled end $a^{108}$ of plunger $a^{100}$, moving plunger $a^{99}$ out of the path of yoke-arm $a^{98}$, and thus effecting the release of rock-shaft $a^{74}$ and its arm $a^{78}$, which moves to the right, under the action of spring-plunger $a^{92}$ through lever $a^{79}$ and pin $a^{82}$, throwing clutch-member 42 into couple with gear 36 if a right-hand thread is to be formed on the rock by tool-spindle $A^4$, and this phase, thus initiated by movement of lever $a^{78}$, includes the rotation of spindle-shaft $c^{14}$ and the threading-tool (not shown), which are fed forward automatically by the co-operation of the threaded collar $c^{20}$ and threaded bushing $c^{24}$ until the threading operation is completed, the drum $a^{84}$ meanwhile having been rotated counter-clockwise so that when the threading operation has been thus completed, the appropriate dog $a^{87}$ initiates the third phase of the cycle, that of reversal, by engaging stud $a^{90}$ and moving levers $a^{79}$ and $a^{78}$ leftward, throwing clutch-member 42 into couple with pinion 40 and causing reverse rotation of spindle $A^4$ and its withdrawal from the work, by reverse co-operative action of the threaded members $c^{20}$ and $c^{24}$, with accompanying reverse rotation of the drum $a^{84}$, clockwise, until the appropriate dog $a^{87}$ is engaged with stud $a^{90}$ and moves lever $a^{79}$ and arm $a^{78}$ into the mid-position shown in Fig. 4, where they are arrested by engagement of the yoke-arm $a^{98}$ with the plunger $a^{99}$ (see Fig. 7) settling the clutch-member 42 in neutral position, and thus stopping movement of the tool-spindle $A^4$ and the drum $a^{34}$, the spindle $A^4$ having been retracted from the work, and the tool-spindle head C and turret-head B being now ready for pull-back movements, co-ordinated by the liaison-member F, which is actuated by the sliding movement of the turret-head B, and the fourth phase of the cycle of operation of the tool-spindle $A^4$ includes its movement bodily, (while at rest) with its sliding head C, leftward in Fig. 1, while the turret $B'$ is pulled back and indexed, by mechanism which I will now describe.

*The turret-head.*

The work-support of my improved machine-tool may be of any construction suitable to effect its co-operative action with the instrumentalities hereinbefore described, and I have selected for illustration and description a form of structure which is preferred by reason of its convenience for effecting such co-operation, and which embodies numerous improvements in turrets, and turret-operating instrumentalities, many of which are applicable to the construction of turrets in a wide range of metal-working machines, and not only to a work-supporting turret in a chucking-machine of my improved automatic type, so that unless limited in specific claims to particular embodiments, I contemplate the utilization of these improvements in any field for which they are adapted by their nature, and so claim such improvements broadly.

In the illustrated embodiment of this portion of my invention, as already briefly recited, the work-support in the nature of a turret-head is designated by the reference character B, and comprises in general a turret $B^1$ having work-supporting devices $B^2$ in the nature of chucks or other suitable devices, the turret $B^1$ being mounted preferably in sliding relation upon the bed A, by means of a slide-member $b$, mounted on ways $a^7$ formed on the bed-portion $a^6$, the slide $b$ having preferably a casing-structure which encloses with substantial completeness the various mechanisms and other instrumentalities requisite for the actuation and operation of the turret $B^1$, this absence of exposed working parts other than those essential to support of work-pieces or the like, constituting a highly important and novel feature of my invention, effecting as it does the complete elimination of many sources of distraction for the operator, and of danger to him and to the mechanism itself.

The slide $b$ may be of any suitable material, dimensions and detail of structure, and as one convenient form of construction I have shown a base-portion $b'$ fitted at $b^3$ (see Fig. 14) to the inner edge of the front slideway $a^7$ of the bed-portion $a^6$, the contiguous faces of this front slideway member $a^7$ and the slide portion $b^8$ being machined to afford a true bearing parallel with the axis of the turret $B'$ and the tool-spindles $A'$, $A^2$, $A^3$ and $A^4$, the upper and lower faces $a^{117}$ of both the front and rear slideways $a^7$ being likewise machined, as are the contiguous lower faces of the slide-portions $b^3$, and the upper faces $b^4$ of the separate slide-retaining members $b^5$, the latter being secured to the slide by bolts $b^6$.

I prefer to provide adjustable means for holding the slide with its face $b^3$ in snug engagement at all times with the rear face of the slideways $a^7$, and for this purpose I have shown a tapered gib $b^7$ interposed between the front face of the slideway $a^7$ and the adjacent face of the slide-portion $b^8$, the gib being held in place and adjusted by a threaded stud $b^9$ and nut $b^{10}$ in connection with a plate $b^{11}$ secured to the slide-portion $b^8$ by screws $b^{12}$.

The turret-head B serves primarily to support the turret $B'$, which may be of any form suitable to carry my invention into effect, and in its preferred form, as illustrated, the turret comprises a disk-like member $b^{13}$ bolted at $b^{14}$ (see Figs. 17 and 35) to the head $b^{15}$ of the turret-shaft $b^{16}$, the turret-shaft $b^{16}$ being mounted in bearings $b^{19}$ and $b^{20}$, supported by the turret-head members $b^{21}$ and $b^{22}$ respectively, the latter being shown as taking the form of a disk, secured to the face $b^{23}$ of the turret-head by bolts $b^{24}$, so that, upon removal of these bolts, the shaft $b^{16}$ can be withdrawn readily from its bearings $b^{19}$ and $b^{20}$ with the turret-disk $b^{13}$ and the bearing-disk $b^{22}$, and other instrumentalities associated with the turret-shaft $b^{16}$.

In accordance with a highly important object of my invention, viz, to secure maximum compactness and solidity of structure in the turret-head, and freedom from exposed rotating parts, I prefer to enclose within the turret-head B the Geneva-index and its co-operating locking devices, together with the actuating and controlling mechanisms therefor, comprising a system of cams, gearing and controlling-levers co-ordinated to effect automatic operation of the turret and consequent presentation of the articles carried thereby, for treatment by the tool or tools operated by the head-stock mechanism, in the cycle or cycles of operations appropriate to the work to be performed by the machine-tool in any given instance.

Accordingly, I have associated the Geneva-index member $b^{25}$ with the turret-shaft $b^{16}$ at a region close to the turret-disk $b^{13}$, this member $b^{25}$ being splined at $b^{26}$ upon the shaft $b^{16}$ directly behind the casing-member $b^{28}$, in the embodiment illustrated, (see Fig. 35), and I have also enclosed within the turret-head B the Geneva-arm member $b^{27}$, which is shown as splined at $b^{28}$ on a shaft $b^{29}$ carried in bearings $b^{30}$ and $b^{31}$ supported in the turret-head members $b^{32}$ and $b^{33}$, this arm being provided with rollers $b^{34}$, $b^{35}$ which take into slots $b^{36}$ of the Geneva-index number $b^{25}$ the number and position of which are determined by the number of indexing movements to be performed, five slots $b^{36}$ being shown in the instance illustrated, (see Fig. 15). The Geneva member $b^{25}$ is also formed with five peripheral notches $b^{37}$, to receive at appropriate intervals a locking device $b^{38}$, mounted in a casing $b^{39}$ at the top of the turret-head B, which encloses also levers $b^{40}$ and $b^{41}$, fulcrumed at $b^{42}$, $b^{43}$, with toothed segments co-operating to withdraw the bolt $b^{38}$ from the notch $b^{37}$ with which it may be engaged at any time, when the lever $b^{40}$ is tripped by one of the rollers $b^{34}$, $b^{35}$ on the Geneva-arm disk $b^{27}$, the bolt $b^{38}$ being normally pressed toward the periphery of the Geneva-disk $b^{25}$ by a coil-spring $b^{44}$ partly enclosed within a socket formed at $b^{45}$ in the plunger which constitutes the bolt, the spring bearing against a closure-plate $b^{46}$ bolted at $b^{47}$ upon the top of the casing $b^{39}$. For the sake of avoiding wear, and consequent inaccuracy of operation, in this important device, I prefer to form the plunger $b^{38}$ of hardened metal, and I provide a hardened tapered gib or bushing $b^{48}$ therefor, the position of which can be adjusted by the draft-screw $b^{49}$ and set-screw $b^{50}$, working in opposition to each other (see Figs. 15 and 12). The shaft $b^{51}$ which forms the journal of lever $b^{41}$ may be squared, as indicated at $b^{52}$ in Fig. 13, to permit manual operation of the locking-bolt $b^{38}$.

Reverting to the turret-shaft $b^{16}$, and the instrumentalities associated therewith, for the sake of compactness, and protection by the enclosing turret-head B, with special reference to Fig. 35, it is to be noted that I have mounted upon an enclosed portion of the turret-shaft $b^{16}$ the main actuating-cam $b^{53}$ of the turret-system, this cam being of any suitable structure.

In accordance with my invention, I prefer to provide a cam of special and novel form, comprising a cylindrical sleeve, formed of separable semi-cylinders to admit of easy removal through the opening in the casing, with a cam-groove, or grooves $b^{54}$, of appropriate contour in its periphery, instead of the cam-straps usually provided in such cams, this cylindrical cam-sleeve (consisting of sections $x$ and $y$ Fig. 12) being mounted upon a cylindrical cam-support $b^{55}$, supported on bearings $b^{56}$ carried by the turret-shaft $b^{16}$, from which the cam-cylinder $b^{55}$ can be removed, through an aperture $b^{57}$ in the forward, upper wall of the head B (see Figs. 12, 14 and 15) this aperture being preferably closed by a cover-plate $b^{58}$ when the machine is in use. I thus provide a cam structure of great solidity and accuracy of operation, and one in which, by substitution of cams, accomplished with greater rapidity and ease than the ordinary changes of cam-straps, the operator can effect the desired changes in the operating cycle of the turret-head and its co-ordinated instrumentalities. The two half-sections of the cam-cylinder $b^{53}$ can be secured in place by suitable means, such as the set-screw $b^{59}$, and may be provided with such further operating parts as that shown at $b^{60}$, the function of which will be described hereinafter, together with that of the stop-pin $b^{61}$, shown in the end of the cylinder $b^{55}$. Without dis-assembling the other parts, these half-sections may be removed and substituted by others.

In addition to the enclosure of the turret-shaft, Geneva-index members and the main cam, as already described, I prefer to enclose also, within the turret-head B, (and for the same purpose of securing compactness, stability and freedom from interference,) substantially all of the component parts of the turret-operating system, including its actuating and controlling mechanisms, which comprise, in the instance illustrated, the several sets of gearing, shafts, clutches, levers, trips and cooperating parts shown diagrammatically in the gear-development Figures 35 and 36, and respectively shown in greater detail in Figs. 12 to 16, inclusive, and Figs. 27 to 34, inclusive, so that, in the following description of the parts so illustrated it will be noted that all are enclosed within the turret-head B unless specifically described otherwise, and all of these mechanisms preferably derive their actuation from a single feed-shaft, such as that designated by the reference numeral 19, and thus all the mechanisms of the turret-head participate in the general co-ordination of my novel machine-tool mechanisms to permit actuation thereof, through a main driving-shaft, by a single source of power, such as a belt or motor, the shaft 19 in this instance being in continuation of the shaft 19 already described in connection with my foregoing description of the headstock $a^4$.

This shaft 19 is parallel with the turret-shaft $b^{16}$ and projects within the turret-head B through an aperture $b^{62}$ (see Fig. 16), near the rear of the turret-head B, rotating in suitable bearings $b^{65}$ and $b^{66}$ (see Figs. 35 and 36) supported by the walls $b^{23}$ and $b^{67}$ of the turret-head, and is provided with collars $b^{69}$ pinned thereon to prevent end-shake, the shaft 19 being constructed and arranged to move lengthwise with the movements of the turret-head B, the shaft sliding within the hub of its driving-gear 18, (see Fig. 9) having long grooves 219 to receive the connecting spline shown at 209 in Fig. 9, and the shaft 19 rotates constantly under the actuation of the main driving shaft D, transmitted by gears 11, 12, 13, 14, shaft 15 and gears 16, 17 and 18.

Within the turret-head B, a sliding clutch-member 101 is mounted rotatably on the shaft 19, and has clutch-teeth 102 and 103 for engagement alternatively with the teeth 104 of a co-operating clutch-member 105 fast on the shaft 19, and with the teeth 106 of another co-operating clutch-member 107 formed with a bevel-gear 108 in mesh with a bevel-gear 109 fast on a shaft 110 mounted in bearings 111 and 112 supported by the turret-head (see Fig. 15), the shaft 110 having a squared end projecting toward the front of the machine in convenient position to permit the operator to turn the shaft 110 manually.

The clutch-member 101 has formed thereon a pinion 113 meshing at all times with a gear 114 fast upon a shaft 115 which constitutes the primary shaft of the turret-head transmission-gearing, and this shaft can be operated by the feed-shaft 19 or the manual shaft 110, according to the position of clutch-member 101, for the operation of which a shifter arm (see Fig. 15) 216 is provided, mounted on a rock-shaft 217 extended to the front of the turret and having a shifting-handle 218, near the squared end of shaft 110. When the clutch-member 101 is in its neutral position the shaft 19 is free to rotate therein, and the primary shaft 115 is at rest, disconnected from both the turret-feed shaft 19 and the manual shaft 110, and the entire transmission gearing and co-ordinated instrumentalities of the turret-head are at rest.

The transmission gearing may be of any suitable character to operate the several turret-head mechanisms, in accordance with the various objects of my invention, and as the preferred construction to effect these objects, I have shown a secondary-shaft 116 mounted to rotate in bearings 117 and 118 supported by the turret-head members $b^{67}$ and $b^{68}$ respectively, this secondary-shaft 116 having at one end a bevel-gear 120 in mesh with a bevel-gear 121 upon a cross-shaft 122 which constitutes the driving-shaft for the main cam $b^{53}$ already described, the cross-shaft 122 being mounted in bearings $b^{69}$ and $b^{70}$ supported in the turret-head members $b^{71}$ and $b^{72}$ respectively an auxiliary ball-bearing $b^{73}$ being preferably provided, to take up the thrust of the worm 123, by which the cross-shaft 122 drives the worm-gear 124, secured by bolts $b^{74}$ upon the hub $b^{75}$ of the main cam-cylinder $b^{55}$.

The primary-shaft 115 and secondary-shaft 116 are provided respectively with clutch-members 125 and 126, splined upon sleeves 127 which are in turn splined to their respective shafts, and these clutch-members, when in the neutral position shown in Fig. 36, are free from connection with the rest of the transmission-gearing, the clutch-member 125 rotating with the primary-shaft 115, and this clutch-member 125 can be moved toward the right into couple with, and to drive at high speed, a cooperating clutch-member 128, upon which is fastened a gear 129, in mesh with a clutch-gear 130 which co-operates with the clutch-member 126 upon the secondary shaft 116, the clutch-members 130 and 126 being usually engaged, ready to drive the secondary shaft and worm-shaft 122 at high-speed, this being the normal speed at which the turret-head is advanced and pulled back, thus accomplishing a notable object of my invention, which is to provide for constant speed during the advancing and pull-back movements, up to the point where indexing or feeding begins, when the speed can be varied at will, in accordance with the requirements of the operation, or cycle of operations, to be performed.

In the illustrated embodiment, these advancing and pull-back movements are accomplished by the action of the cam-groove $b^{54}$ of the main cam $b^{53}$, into which extends a roller $b^{76}$ (see Fig. 12) secured by a bolt $b^{77}$ carried by an abutment member $b^{78}$ mounted upon an auxiliary slide $b^{79}$ moving along the main axis of the machine in ways $b^{80}$ (see Fig. 14) with which the bed-portion $a^{6}$ is provided, and at $b^{81}$ I have shown my preferred means of adjusting the position of the abutment-slide $b^{79}$ and its roller $b^{76}$ to determine the limits of sliding movement of the turret-head B.

Such means comprise a lead-screw $b^{81}$ mounted rotatably in a bracket $b^{82}$ bolted at $b^{83}$ to the end of the bed-portion $a^{6}$, and entering a correspondingly threaded portion $b^{84}$ of the abutment-slide $b^{79}$, and having a squared end $b^{85}$ to receive a handle (not shown) operating in conjunction with a micrometer-scale $b^{87}$, by means of which great delicacy of adjustment can be secured. I prefer to provide also clamping-bolts $b^{88}$ and clamps $b^{89}$ to hold the abutment-slide $b^{79}$ in adjusted position, these clamping-bolts being readily accessible through apertures $b^{90}$ in the bed-portion $a^{6}$, (see Fig. 12).

As the cam $b^{53}$ rotates, the walls $b^{90}$ of its groove $b^{54}$ are engaged progressively with the roller $b^{76}$ on the abutment $b^{78}$ and cause corresponding advance and pull-back movements of the turret-head B relatively to the bed $a^{6}$, at speeds governed by the speed of rotation of the worm-shaft 122, and secondary-shaft 116, as transmitted from the primary shaft 115.

When speeds different from that transmitted by the high-speed, coupled gears 129 and 130 are required, these gears are uncoupled from the shaft 116 by movement of the clutch-member 126 to the left in Fig. 36, while the clutch-member 125 remains in its right-hand position, and the clutch-member 126 is thus coupled with a co-operating clutch-member 131, upon the hub of which is fastened a gear 132, which forms part of a set of gearing comprising a pinion 133 splined to a sleeve 134, rotating freely upon a shaft 135 mounted in bearings 136 and 137 supported by the turret-head portions $b^{68}$ and $b^{91}$ respectively, the sleeve 134 having splined thereto a gear 138 meshing with a pinion 139 (formed on a sleeve 140 running on a fixed shaft 148) and to which is splined a gear 141 which meshes with a gear 142 fast upon the shaft 135. This shaft 135 has splined to its outer end a gear 143 which is one of a set of change-speed gears, the co-operating gear 144 of this set being splined upon a sleeve 145 rotatably mounted on a stud 146 supported at $b^{92}$ in the turret-head portion $b^{68}$, and this set is driven constantly by the primary-shaft 115 through a gear 147 splined upon the shaft 115 and an intermediate gear 146 splined upon the sleeve 145 which carries the change-speed gear 144.

The change-speed gears 143 and 144 are arranged to be accessible for exchange or substitution, being situated at the right-hand end of the machine, as shown in Fig. 14, with a casing $b^{93}$ there shown in section, and provided with a cover $b^{94}$, shown in Fig. 1. By exchange or substitution of these gears 143 and 144, a very extended range of speeds can be secured for the main cam $b^{53}$ and its co-ordinated mechanism, independently of the speeds of any other portion of my improved machine-tool.

Reverting now to the primary-shaft 115, and its clutch-member 125, when the latter is shifted from the right-hand position toward the left, it is coupled by such movement with a co-operating clutch-member 149 mounted to rotate freely upon the primary-shaft 115, and formed with a pinion 150 which is in mesh with a gear 151 mounted upon a stud 152 supported in the portion $b^{95}$ of the turret-head B and serving to transmit the motion derived from the primary shaft 115 to the Geneva-index mechanism, through a set of gearing comprising a gear 153 splined to a shaft 154 mounted to rotate in bearings 155 and 156 (see Fig. 35) supported by the portion $b^{95}$ of the turret-head B, and the turret-head number $b^{33}$, the shaft 154 having fastened upon its inner end a gear 157 meshing with a gear 158 fastened by screws 161 upon the hub of a cam $b^{96}$ which is splined to, and fastened by a set-screw $b^{128}$ upon, the shaft $b^{29}$ which carries and actuates the Geneva-arm-member $b^{27}$.

This cam $b^{96}$ is of the same improved type as the cylindrical main cam $b^{53}$ already described, except that it is mounted directly upon the shaft $b^{29}$, instead of upon a cylindrical support, as it is not necessary to provide for relative rotation between the shaft $b^{29}$ and cam $b^{96}$, the function of the latter being to operate a clamping-device which acts to hold the turret B' rigidly to the turret-head B during treatment of the work carried by the turret.

*The turret clamp.*

Any suitable structure may be provided to effect this important object of my invention, which is applicable to turrets in general, and comprises essentially means to secure maximum stability of the turret, both to avoid casual movements of the work under treatment and to eliminate all torsional strains upon the Geneva-index mechanism, which frequently cause permanent distortion and even fracture thereof.

As the preferred device for this purpose I have shown a clamp (see Figs. 12, 13, 16, 17 and 35) constructed in annular form, comprising two semi-circular members $b^{100}$ and $b^{101}$, hinged together at $b^{102}$ and having inner grooves $b^{103}$ with walls diverging outwardly from their medial plane, to receive, and co-operate with, opposed annular, tapered flanges $b^{104}$ and $b^{105}$, one formed on a rearward extension of the turret-disk, and the other formed on the adjacent face-plate $b^{22}$ of the turret-head B.

The clamping-ring members $b^{100}$ and $b^{101}$ surround the flanges $b^{104}$ and $b^{105}$ peripherally and the tapered walls of the grooves $b^{103}$ embrace the tapered flanges laterally, and the semi-circular clamping sections can be approached toward the axis of the turret, by means of lugs $b^{106}$ and $b^{107}$ at the free ends of the clamp-sections, opposite the hinge $b^{102}$ (see Fig. 16), the effect of thus closing the clamp being to cramp the turret-flange $b^{104}$ against the adjacent flange $b^{105}$ upon the face-plate $b^{22}$, joining the turret to the turret-head as a unitary structure, the turret being then incapable of further rotative or axial movements, and possessing all of the solidity which the turret-head derives from its connection with the bed through the slideways $a^7$ and the retaining-members $b^5$ by which the slide $b$ is bolted at $b^6$ thereto.

I prefer to provide for the automatic actuation of the clamping-members $b^{100}$ and $b^{101}$, by a right-and-left screw device $b^{108}$ engaged with threaded bushings $b^{109}$ and $b^{110}$ secured in the lugs $b^{106}$ and $b^{107}$ non-rotatively by a spline $b^{111}$ fastened by a set-screw $b^{112}$, and for the operation of the right-and-left screw $b^{108}$ I have shown a lever $b^{113}$ to which is pinned at $b^{114}$ a link $b^{115}$, extending at $b^{116}$ (see Fig. 15) through the wall $b^{117}$ of the turret-head and connected pivotally at $b^{118}$ (see Fig. 30) to one arm of a lever $b^{119}$ fulcrumed at $b^{120}$ upon a bracket forming part of the structure of a cover-plate $b^{121}$ which is bolted at $b^{122}$ to the rear of the turret-head B, this lever $b^{119}$ having a roller $b^{123}$ which is supported in position to extend into a cam-groove $b^{124}$ formed in the periphery of the cam $b^{96}$ (see Fig. 35). The link $b^{115}$ is provided preferably with an adjustable turnbuckle $b^{125}$ which can be reached through a handhole $b^{126}$ masked by a closure $b^{127}$, (see Fig. 28).

The cam $b^{96}$ makes rotation for rotation with the Geneva-arm-member $b^{27}$, and as I have shown two operating-rollers $b^{34}$ and $b^{35}$ on the latter, the cam-groove $b^{124}$ of cam $b^{96}$ should be of such contour as to operate the clamp-lever $b^{113}$ twice for each complete rotation of the cam $b^{96}$. The latter is readily accesible through the front aperture $b^{57}$ of the turret-head, when the cover-plate $b^{58}$ is removed, and the cam $b^{96}$ can be removed and a substitute cam replaced readily by withdrawing the shaft $b^{29}$, after loosening the set-screws $b^{128}$ and $b^{129}$ of the cam and Geneva-arm respectively, an aperture $b^{130}$, with a plug $b^{131}$, being provided to permit the shaft $b^{29}$ to pass through the wall $b^{21}$.

I prefer to enclose the clamp and its operating devices within a cover $b^{132}$ (see Figs. 12, 16 and 17) secured by screws $b^{133}$ to the face-plate $b^{22}$, and having a dust-tight bearing at $b^{134}$ against the turret.

The turret and its chucking devices.

I have already described briefly the turret B′ as comprising a disk-like member $b^{13}$ carried by the shaft $b^{16}$, and having a rear flange to be engaged by the clamping device, and in Figs. 17 to 20 I have illustrated in detail the preferred structure of the face of the turret, for support of the chucks or work-supporting devices $B^2$, of which one is shown in elevation in Fig. 17, in place upon the turret-face $b^{135}$. Any suitable chucking-device may be employed, and that illustrated at $B^2$ embodies improvements which I have devised in a well-known type, usually denominated a two-jaw chuck, comprising a base-portion $b^{136}$ having chuck-jaws $b^{137}$ operated by a right-and-left hand screw $b^{138}$ with a square end $b^{139}$ to receive a wrench for setting the chuck-jaws.

The turret may be constructed and arranged to receive any suitable number of chucking-devices, and in the instance illustrated I have shown the turret-face $b^{13}$ as provided with five apertures $b^{140}$, of similar circular design, the same in diameter, and spaced equally as to distance from the axis of the turret and from each other, these apertures serving to receive projections $b^{141}$ at the rear of the chucking-devices, respectively, and by which the general location of the chucks is determined. Each of the chucks has a plurality of lugs $b^{142}$ at one side, with bolt-holes $b^{143}$, through which bolts $b^{144}$ pass into corresponding holes $b^{145}$ in the face of the turret-disk $b^{13}$, and I prefer to provide the other side of each chuck with a ledge $b^{146}$ having similar bolt-holes $b^{143}$ and also having a hole $b^{246}$ to receive a tapered dowel-pin $b^{147}$ which serves to aid in locating the chuck rapidly and accurately at all times, regardless of any slight inaccuracies in the bolts $b^{144}$, due to wear or malformation, the corresponding holes $b^{148}$ in the face of the turret-disk $b^{13}$, to receive the tapered dowels, being drilled through the holes $b^{246}$ respectively, so that exact registration is insured, and complete interchangeability.

The arrangement of face-apertures $b^{140}$ and bolt-holes $b^{145}$ is such, in accordance with an important object of my invention, as to permit the reception by the turret of numerous alternative forms of work-supporting or chucking-devices, one form of which is illustrated in Figs. 24, 25 and 26 as an arbor of a well-known form comprising a base $b^{150}$ with a rearward projection $b^{151}$ to enter any one of the turret-face-apertures $b^{140}$ and an arbor $b^{152}$ with a threaded attaching portion $b^{153}$, and eccentric operating bolt $b^{154}$, with a squared operating shank $b^{155}$ being provided to draw back the arbor, in well-known fashion, with the work attached, into engagement with hardened abutment pieces $b^{156}$ (omitted from Fig. 25).

The base $b^{150}$ of this arbor-device is shown as having a series of bolt-holes $b^{157}$ corresponding in number and arrangement with the bolt-holes $b^{143}$ in the two-jaw chucks above described, so that either form of chucking-device can be used interchangeably upon the turret-face $b^{13}$, the only difference in this attachment portion being that in the base $b^{150}$ of the arbor-device a dowel-hole $b^{158}$ is provided in position to register with any one of a series of tapered dowel-holes $b^{159}$ in the turret-face $b^{13}$, this series being separate and distinct from the series of dowel-holes $b^{148}$ corresponding to the dowel-holes $b^{246}$, this difference aiding in the ease and accuracy of construction and operation, the dowels $b^{147}$ being capable of use with either form of chucking-device, and having nuts $b^{160}$ to facilitate withdrawal of the dowels.

Automatic-turret-control system.

In accordance with an object of primary importance my invention comprehends the provision of a complete system of devices for co-ordinating and controlling the component instrumentalities of the turret-head, both in their relation to each other and to the co-operating mechanisms of the headstock, my novel system providing for the different cycles of operation required by the exigencies of various types of work, the basic principle of my system of control making it possible to adopt a considerable variety of structure without departing from the spirit of this portion of my invention.

In its preferred form, the control system centres around the operation of the clutch-members 125 and 126 upon the primary shaft 115 and secondary-shaft 116 of the transmission gearing carried by the turret-head B, which have been sufficiently described as to their general structure to permit their designation by their reference characters in the following description, and it is only necessary to explain at this point, that while the clutch-members 125 and 126 appear to be spaced apart as shown in the gear-development arrangement of Fig. 35, they are in fact associated closely, as shown in Fig. 27, the shafts 115 and 116 being mounted side by side toward the rear of the turret-head B, and I have provided for operation of the clutches 125 and 126 by two clutch-yoke-levers, $b^{161}$ and $b^{162}$, supported rotatably upon a rod $b^{163}$, the position of which is indicated clearly in dotted lines in Fig. 12, where is shown also in dotted lines the lever $b^{164}$ which is connected to the yoke $b^{161}$ and has a gear-segment $b^{184}$ meshing with a segmental gear $b^{165}$ carried by a rock-shaft $b^{166}$ mounted in bearings $b^{167}$ of the rear cover-plate $b^{121}$, and its projecting end is fitted with an arm $b^{168}$ (see Fig. 28), in connection with which operates a lever $b^{169}$ fastened upon a rock-shaft $b^{170}$, the latter rotating in a bearing $b^{171}$ supported by a bracket $b^{172}$, carried by the face-plate $b^{121}$, and on the inner end of the rock-shaft $b^{170}$ is pinned an arm $b^{173}$ having a stud $b^{174}$ which projects into the path of a cam $b^{60}$ mounted on the periphery of the main cam-cylinder $b^{53}$.

The function of the cam $b^{60}$ is to set the parts ready for indexing, by moving stud $b^{174}$ and its arm $b^{173}$ counter-clockwise, turning the shaft $b^{170}$ so that the lever $b^{169}$ at the front of the face-plate $b^{121}$ is turned clockwise into the position shown in Fig. 28, with its bevelled nose $b^{175}$ engaged by the bevelled nose $b^{176}$ of a plunger $b^{177}$ mounted in a casing $b^{178}$ secured by screws $b^{179}$ to the face-plate $b^{121}$, a spring $b^{180}$ (regulated by a set-screw $b^{181}$) serving to press the plunger $b^{177}$ toward the lever $b^{169}$ and tending to rotate the latter clockwise, when the parts are in the position shown, where they are arranged to be left upon automatic stopping of the machine at the end of an operation.

I prefer to provide means to hold the parts in this position, subject to release by the operator, and for this purpose I have shown in Fig. 14 at $b^{182}$ a sliding rod extending through the turret-head B from front to rear, projecting from the turret-head at its forward end, which is provided with an operating-handle $b^{183}$, the inner end of this rod lying in the path of the yoke-lever arm $b^{164}$, as indicated in Fig. 12, preventing upward movement of the arm $b^{164}$ when the rod $b^{182}$ is at its inward position.

The rod $b^{182}$ can be pushed inward by the handle $b^{183}$, and I have provided for setting it automatically in its inward position, by means of a pin $b^{61}$, projecting from the end of the main-cam-cylinder $b^{55}$, and which engages a collar $b^{184}$ on the rod $b^{182}$, once during each revolution of the main-cam $b^{53}$. This pin $b^{61}$ serves also as a safety-stop to limit the extent of backward indexing movements, for which purpose I have pivoted a latch $b^{185}$ on the end-wall of the turret-head (see Figs. 13 and 14), and this latch swings freely when engaged by the pin $b^{61}$ when the cam $b^{53}$ is rotating in the direction of the arrow, Fig. 14, but the latch is stopped by a stud $b^{186}$, also set in the end-wall of the turret-head B, if the pin $b^{61}$ moves in reverse direction, when the motion of cam-cylinder 53 is reversed by backward indexing. Such backward indexing is desirable at times, to permit resetting the work, or correction of errors in operation, but if it is carried too far it may result in serious damage to the mechanism, and accordingly I have arranged thus for avoidance of back-indexing to a destructive extent, without preventing a reasonable amount.

When the operator wishes to start the machine, he pulls out the handle $b^{183}$, and draws the rod $b^{182}$ out of the path of the arm $b^{164}$ of the yoke-lever $b^{161}$, and the latter is shifted to couple the clutch-member 125 with the clutch-gear 149, the shifting being initiated and completed rapidly by the action of the spring $b^{180}$ upon plunger $b^{177}$, its nose $b^{176}$ crowding the nose $b^{175}$ of lever $b^{169}$ downward and turning the lever $b^{169}$ clockwise, the latter operating through an adjustable tappet-screw $b^{187}$ to rotate arm $b^{168}$ and rock-shaft $b^{166}$, depressing the gear-segments $b^{165}$ and $b^{184}$ and turning yoke-arm $b^{164}$ to couple clutch-member 125 with clutch-gear 149, as already described briefly. As the primary shaft 115 is constantly rotating, its motion is transmitted by gears 149, 151, 153, shaft 154, gears 157 and 158, cam $b^{96}$ and shaft $b^{29}$ to the index-members $b^{27}$ and $b^{25}$, and to shaft $b^{16}$ and turret B', for an indexing operation. The roller $b^{34}$ on the Geneva-arm-member $b^{27}$ is then opposite one of the slots $b^{36}$ in the other Geneva-index-member $b^{25}$, as shown in Fig. 15, and enters the same, as the member $b^{27}$ rotates, while the other roller thereon, $b^{35}$, is carried into engagement with the lever $b^{40}$, and swings it upward, acting through the meshed segmental gears of the levers $b^{40}$ and $b^{41}$, to raise the bolt $b^{38}$ from the notch $b^{37}$ of the member $b^{25}$ and release the latter for an indexing movement. This movement is accomplished as the roller $b^{34}$ progressively enters the slot $b^{36}$ to the position shown in Fig. 35 and passes beyond to the position formerly occupied by the roller $b^{35}$ in Fig. 15, during which period the roller $b^{35}$ has released the lever $b^{40}$, and the spring $b^{44}$ has forced the locking-bolt $b^{38}$ into the next peripheral notch $b^{37}$.

At the initiation of the indexing movement above described, the clamping-members $b^{100}$ and $b^{101}$ have been separated through rotation of the right-and-left screw $b^{108}$ by the lever $b^{113}$, operated by link $b^{115}$, lever $b^{119}$ and roller $b^{123}$, working in groove $b^{124}$ of the cam $b^{96}$, on the shaft $b^{29}$, so that the turret is released for the indexing operation, and by the time that the indexing-roller $b^{34}$ reaches its position in place of roller $b^{35}$ in Fig. 15, the roller $b^{123}$ will have been engaged by a portion of the walls of groove $b^{124}$ in the periphery of cam $b^{96}$ suitable to operate the lever $b^{119}$, link $b^{115}$, lever $b^{113}$ and right-and-left screw $b^{108}$, to contract the clamping-members $b^{100}$ and $b^{101}$ and cramp the turret-flange $b^{104}$ to the flange $b^{105}$ of the face-plate $b^{22}$, securing the turret solidly during the remaining phases of the cycle of operations, including the advance of the turret-head, the mechanism for initiating which I will now describe.

In accordance with an important object of my invention, the cam $b^{53}$ has remained idle during the indexing operation, which not only makes it possible to use a smaller cam, but greatly simplifies its layout for various conditions, and to initiate its rotation for advancing the turret-head I have provided cams $b^{188}$ and $b^{189}$ upon the periphery of the Geneva-index-member $b^{27}$, in the path of which cams is extended a stud $b^{190}$ (see Figs. 29 and 15) upon a lever $b^{191}$ pivoted on a shaft $b^{192}$ on the inner face of the plate $b^{121}$, this shaft having also an arm connected by a link $b^{193}$ to an arm $b^{194}$ on the rock-shaft $b^{170}$ already described.

When the projection $b^{188}$ on the Geneva-arm-member $b^{27}$ engages the stud $b^{190}$ at the end of the indexing operation, it rotates the lever $b^{191}$ counter-clockwise, moves link $b^{193}$ to rotate the arm $b^{194}$ and rock-shaft $b^{170}$, and turns the lever $b^{169}$ counter-clockwise, forcing its bevelled nose $b^{175}$ past the bevelled nose $b^{176}$ of plunger $b^{177}$, against the action of spring $b^{180}$ until past the midpoint, when the spring accelerates and completes the throw of lever $b^{169}$, and through it, and the opposed adjustable tappet-screw $b^{195}$, turns the arm $b^{168}$ and rock-shaft $b^{166}$ to elevate the segmental-gears $b^{165}$ and $b^{184}$, swinging the clutch-yoke lever $b^{161}$ to couple the clutch-member 125 with the clutch-member 128, so that gear 129 is rotated by the constantly-running primary-shaft 115 and transmits the motion thereof to gear 130 on secondary shaft 116, to which is splined the clutch-member 126.

Instead of being in neutral position normally, as shown in Fig. 36, the clutch-member 126 is normally coupled with the co-operating clutch-gear 130, being held there by action of the clutch-yoke $b^{162}$ shown in Fig. 27, the latter having a segmental gear $b^{196}$ meshing with a segmental-gear $b^{197}$ (see Fig. 29) upon a rock-shaft $b^{198}$, journalled in the face-plate $b^{121}$, having upon its outer end (see Fig. 28) an arm $b^{199}$, in position to be operated by a lever $b^{200}$ mounted on a rock-shaft $b^{201}$, with a bevelled nose $b^{202}$ in engagement with the bevelled nose $b^{203}$ of a plunger $b^{204}$ normally pressed outwardly by a spring $b^{205}$, (regulated by a set-screw $b^{206}$), in a casing $b^{207}$ secured by screws $b^{208}$ upon the face-plate $b^{121}$, this mechanism being shown in section in Fig. 34.

The parts above described occupy normally the position illustrated, the spring $b^{205}$ holding the lever $b^{200}$ in extreme upward position, with the yoke-lever $b^{162}$ holding clutch-member 126 in couple with clutch-gear 130 (see Fig. 36) so that when the clutch-member 125 on primary-shaft 115 is coupled to clutch-gear 129, the shaft 116 is at once rotated at high speed, and acts through gears 120, 121 and shaft 122 to rotate the worm 123, worm-gear 124 and main-cam $b^{53}$ at high speed for advancing the turret-head B to feeding-point, through the action of the walls $b^{90}$ of cam-groove $b^{54}$ upon the roller $b^{76}$ upon abutment $b^{78}$.

When the predetermined advance of the turret-head has been accomplished, the clutch-member 126 is coupled automatically with clutch-member 131, which rotates constantly under the action of the low-speed transmission gearing, including gears 132, 133, 134, 138, 139, 141, 142, shaft 135 and change-speed gears 143, 144, 146 and 147, under the action of the primary-shaft 115, and while this feeding movement continues, at the rate predetermined by appropriate setting of the above described chain of gears, the clutch-member 126 will be left in couple with the clutch-member 131.

The movements of the clutch-member 126 are effected by cam-devices $b^{208}$ and $b^{209}$, (see Fig. 35) which alternatively engage a stud $b^{210}$ (see Fig. 29) upon an arm $b^{211}$ pinned upon a rock-shaft $b^{212}$ mounted in bearings $b^{213}$ supported by a bracket $b^{214}$ carried by the face-plate $b^{121}$, this shaft having another arm $b^{215}$ connected by a link $b^{216}$ to an arm $b^{217}$ fast upon the rock-shaft $b^{201}$ which carries the lever $b^{200}$ already described, and when the stud $b^{210}$ is engaged and operated by the cam-projections $b^{208}$ and $b^{209}$ the clutch-member 126 is operated accordingly, its throw being facilitated and completed rapidly by the action of spring-plunger $b^{204}$ against the lever $b^{200}$.

The cam-projections $b^{208}$ and $b^{209}$ are shown as carried by riders $b^{218}$ and $b^{219}$ pinned at $b^{220}$ respectively upon a ring $b^{221}$ secured by screws $b^{222}$ to segmental shoulders $b^{223}$ formed integrally with the annular worm-gear 124, and their position can be adjusted thereon to vary the timing of the feeding movements of the turret-head B.

By the above mechanism I am enabled to secure the desired rate of feed of the turret-head during the phase of treatment of the work by the tools mounted on the spindles A', $A^2$, $A^3$, and $A^4$, and a constant rapid speed during the advance and pull-back movements of the turret-head, avoiding the proportionality of action in existing structures in which a fast-feeding turret indexes rapidly, and a slow-feeding turret indexes slowly.

In my improved machine, the indexing mechanism comprises the cam $b^{96}$ individual thereto, and only employed during the indexing action.

By the above arrangements for automatic initiation of the respective phases in a cycle of operations, and for restoring the parts automatically to a predetermined relative position at the end of such cycles, I provide for the avoidance of an accumulation of errors, for such slight errors as are sometimes due to a slippage of teeth during the period when a clutch is being coupled, will be automatically compensated for at the end of the cycle, and will not accumulate.

This purpose is served notably by my arrangements for keeping one or other of the clutches in coupled relation with one of its co-operating clutch-members at any given instant, which diminishes greatly the chance of imperfect coupling action.

In my description hereinbefore of the form of chuck illustrated in Figs. 21 to 23, for the sake of brevity I recited only the features in which it co-operated with the preferred form of turret, but in this preferred form of chuck I have provided certain improvements in the construction of such chucks which are of importance as applicable to chucks in general, and which accordingly I claim broadly as my invention.

These will be understood best upon reference to Figures 21 to 23, and comprise primarily the formation of the chuck-body $b^{136}$ as a member solid throughout its extent, except for the portions of its face relieved for the reception of the chucking bits $b^{137}$, and the bores which receive respectively the body parts of the bits, the right-and-left screw $b^{138}$ for operation of the bits, the plug $b^{238}$ for retention of said screw, and the central face-aperture containing the bushing shown at 230.

The face $b^{136}$ of my improved chuck, accordingly, presents maximum resistance to disruptive transverse strains, and by constructing the body-parts 231 of the bits in substantially circular cross-section, with straight sides 232 for the jaws, I am enabled to grind these parts very accurately, and also the contiguous walls 233 of the relieved portions of the face and the walls 234 of the bore in which the body-parts 231 move, so that there is practically no play possible therebetween, and minimum wear, insuring sustained rigidity of support for the work-piece, an object which is also served by localizing the strain of such support at the upright portion 233, which is the most rigid part of the chuck-structure.

A further novel feature of importance in my improved chucking-device, in its relationship to the turret B', is the arrangement of the central aperture 234 with its bushing 230 to discharge chips into the body of the turret through the aperture $b^{140}$. The interior of the turret is chambered, as shown at 235, and has peripheral discharge openings 236, through which the chips may pass freely, after having been cleared from the bushing 230 by a pilot-bar fitted in one of the spindles of the headstock.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefor, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A combined threading and tooling mechanism comprising a relatively movable tool-carrier and work-carrier; a head; a spindle slidable in said head for supporting a threading tool; means for preventing relative movement between said head and said work-carrier while simultaneously causing relative movement between said tool-carrier and said work-carrier; and mechanism for positively causing said spindle to function during the last mentioned relative movement.

2. An automatic mechanism for forming and threading work comprising in combination a first head for the work, a second head for a forming tool and a third head for a threading spindle; a mechanism for causing relative feeding movement between said first and second, and second and third, but not first and third heads; and means for positively causing said threading spindle to function on the work during said relative movements.

3. A combined threading and tooling mechanism comprising a relatively movable tool-carrier and work-carrier; an auxiliary head; a threading spindle; means for preventing relative movement between said auxiliary head and said work-carrier while simultaneously causing relative movement between said two carriers; and mechanism for positively feeding and rotating said threading spindle to enable a threading tool thereon to cut threads while a relative movement between said carriers is taking place.

4. An automatic mechanism for both forming and threading work comprising in combination three heads for the work, for a forming-tool and for a threading spindle respectively; a mechanism for causing relative feeding movement between said first and second, and second and third, but not first and third heads; and means for positively feeding said threading spindle towards the work simultaneously with said relative movements.

5. A chucking machine combining a main head for supporting a forming-tool; a work-carrier; an auxiliary tap-supporting head; mechanism operative at a predetermined period to maintain said carrier and said tap-supporting head in unitary relation; means for simultaneously feeding the tap into the work; and means for effecting during said period an approach between the main head and said carrier.

6. In a metal-working machine, a bed, a turret-head; and a tool-spindle-head; said heads being mounted upon said bed in sliding relation thereto and to each other and each of said heads constituting a unitary structure movable as such with its co-ordinated instrumentalities; said turret-head comprising a slide, a turret mounted rotatably thereon, indexing devices for said turret and a safety device to control said indexing devices, locking mechanism therefor and feeding mechanism for said turret-head, including a feed-cam; and said multiple-tool spindle-head comprising a slide having a rotatable tool-spindle; and means to impart a positive feed to said spindle.

7. In a metal-working-machine, a bed; a turret-head carried by a slide mounted on said bed; a tool-spindle carried by a slide also mounted on said bed; and means to co-ordinate the sliding movements of said instrumentalities.

8. In a metal-working machine, a bed; a turret-head carried by a slide mounted on said bed; a tool-spindle carried by a slide also mounted on said bed; and a liaison-member to co-ordinate the sliding-movements of said instrumentalities.

9. In a metal-working-machine, a bed; a sliding turret-head thereon, comprising a turret, indexing mechanism and locking mechanism for said turret, feed mechanism for said turret-head, including speed change-gearing, reversing and speed-controlling devices, and controlling cams, and a feed shaft with gearing to connect said shaft operatively with the respective instrumentalities of said turret-head; a multiple-spindle headstock connected with said bed and comprising a plurality of tool-spindles, one of said spindles being carried by a head mounted slidingly on said headstock, feeding mechanism for said tool-spindle head, and means to actuate said head-tool spindle rotatively, and a shaft to operate said feeding mechanism and actuating means; a main actuating gear common to said spindles other than said head-tool-spindle and individual speed-change gears for each of said spindles; a main driving-shaft; and connections between said main shaft and said turret-feed shaft, said tool-spindle-head and said common spindle-driving-gear respectively, to permit actuation of the several instrumentalities thereof, through said main shaft.

10. In a metal-working-machine, a bed; a sliding turret-head thereon, comprising a turret, indexing mechanism and locking mechanism for said turret, feed mechanism for said turret-head including speed change-gearing, reversing and speed-controlling devices, and controlling cams, and a feed-shaft with gearing to connect said shaft operatively with the respective instrumentalities of said turret-head; a multiple-spindle-headstock connected with said bed and comprising a plurality of tool-spindles, one of said spindles being carried by a head mounted slidingly on said headstock, feeding mechanism for said tool-spindle-head, and means to actuate said head-tool-spindle rotatively, and a shaft to operate said feeding mechanism and actuating means; a main actuating gear common to said spindles other than said head-tool-spindle, and individual speed-change gears for each of said spindles; a main driving-shaft and connections between said main shaft and said turret-feed-shaft, said tool-spindle-head and said common spindle-driving-gear respectively, to permit actuation of the several instrumentalities thereof, through said main shaft, by a single source of power, such as a belt or motor.

11. In a metal-working-machine, a bed; a sliding turret-head thereon, comprising a turret, indexing mechanism and locking mechanism for said turret, feed mechanism for said turret-head, including speed change-gearing, reversing and speed-controlling devices, and controlling cams, and a feed-shaft with gearing to connect said shaft operatively with the respective instrumentalities of said turret-head; a multiple-spindle-headstock connected with said bed and comprising a plurality of tool-spindles, one of said spindles being carried by a head mounted slidingly on said headstock, feeding mechanism for said tool-spindle-head, and means to actuate said head-tool-spindle rotatively, and a shaft to operate said feeding mechanism and actuating means; a main actuating gear common to said spindles other than said head-tool-spindle, and individual speed-change gears for each of said spindles; a main driving-shaft; and connections between said main shaft and said turret-feed-shaft, said tool-spindle-head and said common spindle-driving gear respectively, to permit actuation of the several instrumentalities thereof through said main shaft; said connections comprising a set of gearing connecting said main shaft with said turret-feed shaft, a separate set of gearing connecting said main shaft with said main-spindle-actuating gear, and another set of gearing connecting said main shaft with said head-tool-spindle.

12. In a metal-working-machine, a bed; a sliding turret-head thereon, comprising a turret, indexing mechanism and locking mechanism for said turret, feed mechanism for said turret-head, including a speed change-gearing, reversing and speed-controlling devices, and controlling cams, and a feed-shaft with gearing to connect said shaft operatively with the respective instrumentalities of said turret-head; a multiple-spindle headstock connected with said bed and comprising a plurality of tool-spindles, one of said spindles being carried by a head mounted slidingly on said headstock, feeding mechanism for said tool-spindle-head, and means to actuate said head-tool-spindle rotatively, and a shaft to operate said feeding mechanism and actuating means; a main actuating gear common to said spindles other than said head-tool-spindle and individual speed-change gears for each of said spindles; a main driving-shaft; and connections between said main shaft and said turret-feed-shaft, said tool-spindle-head and said common spindle-driving-gear respectively, to permit actuation of the several instrumentalities thereof, through said main shaft; said connections comprising a set of gearing connecting said main shaft with said turret-feed-shaft, a separate set of gearing connecting said main shaft with said main-spindle-actuating gear, and another set of gearing connecting said main shaft with said head-tool-spindle; said sets respectively being provided with independent speed-change gears.

13. In a metal-working-machine, a bed; a sliding turret-head thereon, comprising a turret, indexing mechanism and locking mechanism for said turret, feed mechanism for said turret-head, including speed change-gearing, reversing and speed-controlling devices, and controlling cams, and a feed-shaft with gearing to connect said shaft operatively with the respective instrumentalities of said turret-head; a multiple-spindle-headstock connected with said bed and comprising a plurality of tool-spindles, one of said spindles being carried by a head mounted slidingly on said headstock, feeding mechanism for said tool-spindle-head, and means to actuate said head-tool-spindle rotatively, and a shaft to operate said feeding mechanism and actuating means; a main actuating gear common to said spindles other than said head-tool-spindle and individual speed-change gears for each of said spindles; a main driving-shaft; and connections between said main shaft and said turret-feed-shaft, said tool-spindle head and said common spindle-driving-gear respectively, to permit actuation of the several instrumentalities thereof, through said main shaft; said connections comprising a set of gearing connecting said main shaft with said turret-feed shaft, a separate set of gearing connecting said main shaft with said main-spindle-actuating gear, and another set of gearing connecting said main shaft with said head-tool-spindle; said sets respectively being provided with independent speed-change gears and controlling devices.

14. In a metal-working-machine, a bed; a sliding turret-head thereon, comprising a turret, indexing mechanism and locking mechanism for said turret, feed mechanism for said turret-head, including speed change-gearing, reversing and speed-controlling devices, and controlling cams, and a feed-shaft with gearing to connect said shaft operatively with the respective instrumentalities of said turret-head; a multiple-spindle-headstock connected with said bed and comprising a plurality of tool-spindles, one of said spindles being carried by a head mounted slidingly on said headstock, feeding mechanism for said tool-spindle-head, and means to actuate said head-tool spindle rotatively, and a shaft to operate said feeding mechanism and actuating means; a main actuating gear common to said spindles other than said head-tool-spindle and individual speed-change gears for each of said spindles; a main driving-shaft; and connections between said main shaft and said turret-feed-shaft, said tool-spindle-head and said common spindle-driving-gear respectively, to permit actuation of the several instrumentalities thereof, through said main shaft; said connections comprising a set of gearing connecting said main shaft with said turret-feed-shaft, a separate set of gearing connecting said main shaft with said main-spindle-actuating gear, and another set of gearing connecting said main shaft with said head-tool-spindle; said sets respectively being provided with independent speed-change gears; and controlling devices including reversing mechanism.

15. A metal working machine combining a work carrying head; a number of work holders progressively displaceable on said head; an auxiliary head arranged in unitary relation with said first mentioned head; a threading spindle mounted in said auxiliary head; a head for supporting a spindle for a forming tool; and means for effecting a movement of said last head relatively to the first mentioned heads as a unit.

16. A chucking machine combining a bed; a work supporting turret and a spindle head slidable as a unit on said bed; a spindle in said head; and means for translating said spindle relatively to its head during a unitary translation of said turret and head on said bed.

17. A chucking machine combining a bed; a turret; a spindle in opposition thereto; mounting means for said turret and spindle adapted simultaneously to slide on said bed; and means to translate said spindle independently of the slide on said bed of said first mentioned means.

18. A metal working machine combining a support for work blanks; a spindle arranged in opposition with one of said work blanks; mounting means for said work support and said spindle to slide simultaneously; another spindle; and means for simultaneously but at different rates accomplishing a relative translation between said spindles and said blanks.

19. In a metal-working-machine, a bed; a work-support and a tool-spindle mounted slidingly on said bed; and connections between said work-support and tool-spindle to effect sliding movement of said tool-spindle by the sliding-movement of said work-support.

20. In a metal-working-machine, a bed; a work-support and a tool-spindle mounted slidingly on said bed; and means to connect said work-support and tool-spindle to co-ordinate the relative sliding movements thereof; said means comprising a double-rack-and-pinion-mechanism.

21. In a metal-working-machine, a bed; a work-support and a tool-spindle mounted slidingly on said bed; and means to connect said work-support and tool-spindle, to co-ordinate the relative sliding movements thereof; said means comprising a double-rack-and-pinion-mechanism and a liaison-member.

22. In a metal-working-machine, a bed; a work-support and a tool-spindle mounted slidingly on said bed; and means to connect said work-support and tool-spindle to co-ordinate the respective sliding movements thereof; said means comprising a liaison-member; and a locking-device to secure said liaison member in adjusted position during a portion of said sliding movement.

23. In a metal-working machine, a bed; a work-support and a tool-spindle mounted slidingly on said bed; and a removable liaison member to co-ordinate the respective sliding movements of said work-support and tool-spindle when said liaison member is in place, connecting said work-support and tool-spindle.

24. In a metal-working-machine, a bed; a multiple-spindle-headstock connected with said bed and comprising a plurality of tool-spindles, and a head mounted on said headstock and carrying one of said spindles, being movable bodily with said spindle in sliding relation to said headstock.

25. In a metal-working-machine, a bed; a multiple-spindle-headstock connected with said bed and comprising a plurality of tool-spindles, and a head mounted on said headstock and carrying one of said spindles, being movable bodily with said spindle in sliding relation to said head-stock, and mechanism to feed said spindle relatively to its supporting-head.

26. In a metal-working-machine, a bed; a multiple-spindle-headstock connected with said bed and comprising a plurality of tool-spindles, and a head mounted on said headstock and carrying one of said spindles, being movable bodily with said spindle in sliding relation to said head-stock, and said spindle having lead-screw mechanism to feed said spindle relatively to its supporting head.

27. In a metal-working-machine, a bed; a multiple-spindle-headstock connected with said bed and comprising a plurality of tool-spindles, and a head mounted on said headstock and carrying one of said spindles, being movable bodily with said spindle in sliding relation to said headstock, and mechanism forming a component part of the spindle structure, to feed said spindle relatively to its supporting-head.

28. In a metal-working-machine, a bed; a multiple-spindle-headstock connected with said bed and comprising a plurality of tool-spindles, and a head mounted on said headstock and carrying one of said spindles, being movable bodily with said spindle in sliding relation to said headstock, and said spindle having lead-screw mechanism forming a component part of the spindle structure, to feed said spindle relatively to its supporting-head.

29. In a metal-working-machine, a bed; a multiple-spindle-headstock connected with said bed and comprising a plurality of tool-spindles, and a head mounted on said headstock and carrying one of said spindles, being movable bodily with said spindle in sliding relation to said headstock, said spindle having lead-screw mechanism forming a component part of the spindle structure, to feed said spindle relatively to its supporting-head; and means to feed said head and spindle as a unitary structure relatively to said headstock.

30. In a metal-working-machine, a bed; a multiple-spindle-headstock connected with said bed and comprising a plurality of tool-spindles, and a head mounted on said headstock and carrying one of said spindles, being movable bodily with said spindle in sliding relation to said headstock, said spindle having lead-screw mechanism forming a component part of the spindle structure, to feed said spindle relatively to its supporting-head; and means to feed said head and spindle as a unitary structure relatively to said headstock; said means comprising a double rack and pinion mechanism.

31. A metal working machine combining an auxiliary head; two concentric spindles journaled therein, each being independently translated by an individual lead screw; a support for holding blanks, one being in opposition with said spindles; an independent spindle for a forming-tool; and means for translating said auxiliary head and said support as a unit relatively to said last mentioned spindle.

32. A metal working machine combining a support; two concentric spindles rotatably journaled therein; means for simultaneously rotating said spindles; and individual self feeding devices forming a component part of the structure of each spindle and serving to translate the spindles at different rates axially on said support, said devices each comprising a pair of threaded members, the one carried by its spindle and the other by said support.

33. In a metal-working machine, a support, a spindle mounted rotatively in said support, means to rotate said spindle, and devices to cause self-feeding-axial movement of said spindle when rotated, said devices comprising an exteriorly-threaded collar carried by said spindle and a co-operating interiorly-threaded bushing carried by said support; another interiorly threaded bushing carried by said support, and a co-operating exteriorly threaded collar carried by a sleeve movable lengthwise upon said spindle and connected to rotate therewith, whereby the feeding of said sleeve may be effected independently of said spindle but in co-ordination therewith.

34. In a metal-working machine, a support, a spindle mounted rotatively in said support, means to rotate said spindle, and devices to cause self-feed-axial movement of said spindle when rotated, said devices comprising an exteriorly-threaded collar carried by said spindle and a co-operating interiorly-threaded bushing carried by said support; another interiorly threaded bushing carried by said support, and a co-operating exteriorly-threaded collar carried by a sleeve movable lengthwise upon said spindle and connected to rotate therewith, whereby the feeding of said sleeve may be effected independently of said spindle but in co-ordination therewith; and means to connect said sleeve with said spindle to equalize the feeding movements thereof.

35. In a metal-working machine, a support, a spindle-shaft and spindle-sleeve mounted concentrically in bearings carried by said support, being secured together and capable of rotative and lengthwise movements together in said bearings, a plurality of threaded collars secured non-rotatively upon said spindle and spaced apart, one of said collars being mounted upon said spindle-shaft and said other collar being mounted upon said sleeve, a plurality of co-operating threaded bushings mounted within bosses, one near each end of said spindle, and means to rotate said shaft and sleeve, said means comprising a gear mounted upon said shaft and meshing with a long pinion carried rotatively upon a shaft mounted in opposed sockets upon said support, said instrumentalities co-operating when said pinion is rotated to cause rotation of said shaft-gear, shaft and sleeve, with resultant engagement of said threaded collars and lengthwise movement of said shaft and sleeve, the consequent movement of said shaft and shaft-gear being accommodated by the length of said long pinion.

36. A chucking machine combining an auxiliary head; two spindles concentrically journaled therein; means for translating each spindle independently in said head; a turret arranged in opposition to said spindles; a support for said turret in unitary relation with said head; a spindle for a forming-tool; and means for accomplishing relative translation between said turret and said latter spindle and for simultaneously accomplishing a translation between said turret and said concentric spindles at different rates.

37. A chucking machine combining a turret for holding a number of blanks at corresponding stations; two concentric spindles co-axially in opposition with one of said stations; a unitary structure for mounting both said spindles and said turret; a fixed head for a forming-tool spindle; means for moving said structure as a unit towards said fixed head; and means for independently translating said spindles with respect to said turret.

38. In a metal-working-machine, a bed, a work-support mounted slidingly thereon, a headstock connected with said bed and having a plurality of tool-spindles mounted rotatably thereon, one of said spindles constituting a tapping-spindle and being mounted on a head movable bodily with said tapping spindle relatively to said headstock, and means for preventing relative motion between said head and work-support.

39. In a metal-working machine, a headstock, a head mounted slidingly thereon, a tool-spindle carried by said head, and means to permit fast feeding of said head, and relatively slow rotation of said spindle.

40. In a metal-working machine, a headstock, a head mounted slidingly thereon, a tool-spindle carried by said head, and means to permit fast feeding of said head, and relatively slow rotation of said spindle; said means comprising a double-rack-and-pinion feeding device intermediate said headstock and head and variable speed mechanism in said headstock for rotating said spindle.

41. In a metal-working-machine, a headstock; a plurality of tool-spindles mounted rotatively in said headstock and actuating mechanism for said tool-spindles; a head mounted slidingly on said headstock, a tool-spindle carried by said head, and individual actuating mechanism for said tool spindle, including speed-change gears.

42. In a metal-working-machine, a headstock, a head mounted slidingly thereon, a tool-spindle carried by said head, and actuating-mechanism for said tool-spindle, including speed-change gears, in said headstock.

43. In a metal-working-machine, a plurality of spindles, a main driving-shaft, connections to permit actuation of said spindles respectively by said shaft, and means to permit control of the operation of one of said spindles independently of the other spindles, said means including reversing mechanism, and a drum connected to revolve with said independent spindle and fitted with a dog to operate said reversing mechanism.

44. In a metal-working-machine, a plurality of spindles, a main driving-shaft, connections to permit actuation of said spindles respectively by said shaft, and means to permit control of the operation of one of said spindles independently of the other spindles, said means including reversing mechanism, and a drum connected to revolve with said independent spindle and fitted with a plurality of dogs to operate said reversing mechanism.

45. In a metal-working machine, a reciprocating tool-spindle-head, a tool-spindle mounted rotatably thereon, mechanism to rotate said spindle, and a device to restrain the operation of said spindle-operating mechanism at times.

46. In a metal-working machine, a reciprocating tool-spindle-head, a tool-spindle mounted rotatably thereon, mechanism to rotate said spindle, and a device to restrain the operation of said spindle-operating mechanism at times; said device being operated by the reciprocating movement of said head.

47. In a metal-working machine, a reciprocating tool-spindle-head, a tool-spindle mounted rotatably thereon, mechanism to rotate said spindle, and a reversible device to restrain the operation of said spindle-operating mechanism at times.

48. An automatic mechanism for both forming and threading work comprising in combination three heads for the work, for a forming-tool and for a tap respectively; a mechanism for causing relative feeding movement between said first and second, and second and third, but not first and third heads; means for positively screwing said tap into the work simultaneously with said relative movements; and means for independently reversing the relative feeding movement between said first and second heads.

49. A chucking machine combining a main head for supporting a forming-tool; a work-carrier; an auxiliary tap-supporting head; mechanism operative at a predetermined period to maintain said carrier and said tap-supporting head in unitary relation; means acting during said period for screwing the tap positively into and positively out of the work; and means operative during the screwing of said tap for effecting an approach between the main head and said carrier to cause said forming tool to cut said work.

50. A machine for simultaneously tapping and forming work, said machine combining a work-head and a forming-tool-head; means bringing said heads together and apart to form the work; an auxiliary head; a threading tool mounted shiftably therein; means for maintaining in unitary relation said work-head and said auxiliary-head; and means for causing said threading-tool to act on said work while said relation is being maintained.

In witness whereof, I have hereunto subscribed my name.

ADOLPH L. DE LEEUW.